(12) United States Patent
Goldberg et al.

(10) Patent No.: US 12,496,033 B2
(45) Date of Patent: Dec. 16, 2025

(54) FOR MEASURING THE AXIAL (TRANSVERSE), CORONAL (FRONTAL) AND SAGITTAL (BISECTION) ALIGNMENT OF A LOWER LIMB

(71) Applicant: CurveBeam, LLC, Hatfield, PA (US)

(72) Inventors: Andrew Goldberg, Bushey (GB); Uwe Mundry, Easley, SC (US); Stuti Singh, Seattle, WA (US); Guy Long, Surrey (GB); Francois L.A. Lintz, Balma (FR); Cesar de Cesar Netto, Durham, NC (US)

(73) Assignee: CurveBeam, LLC, Hatfield, PA (US)

( * ) Notice: Subject to any disclaimer, the term of this patent is extended or adjusted under 35 U.S.C. 154(b) by 395 days.

(21) Appl. No.: 17/967,743

(22) Filed: Oct. 17, 2022

(65) Prior Publication Data

US 2023/0119098 A1    Apr. 20, 2023

Related U.S. Application Data

(60) Provisional application No. 63/256,741, filed on Oct. 18, 2021.

(51) Int. Cl.
*A61B 6/00* (2024.01)
*A61B 6/03* (2006.01)
*A61B 6/50* (2024.01)
*G06T 7/68* (2017.01)

(52) U.S. Cl.
CPC ............ *A61B 6/5217* (2013.01); *A61B 6/032* (2013.01); *A61B 6/505* (2013.01); *G06T 7/68* (2017.01); *G06T 2207/30008* (2013.01)

(58) Field of Classification Search
None
See application file for complete search history.

(56) References Cited

PUBLICATIONS

Automatically Assessing Limb Alignment and Hip Fracture using 3D models (Year: 2013).*
Automatically Assessing Limb Alignment and Hip Fracture using 3D models (Year: 2013) (Year: 2013).*
Argenson et al., "Anatomy of the dysplastic hip and consequences for total hip arthroplasty", Clin Orthop Relat Res 2007; 465:40-5.

(Continued)

*Primary Examiner* — Andrew H Lam
(74) *Attorney, Agent, or Firm* — LLP Faegre Drinker Biddle & Reath LLP

(57) ABSTRACT

A method of determining axial alignment of a lower limb includes determining a three-dimensional volume based on a scan of a lower limb of a patient, identifying a level of hip version by referring to a first axis of symmetry of a femoral neck and a second axis of symmetry of a distal portion of a femur, wherein hip version is defined by an angle between the first axis of symmetry and the second the second axis of symmetry, identifying a level of tibial torsion by referring to a third axis of symmetry of a proximal portion of a tibia and a fourth axis of symmetry of a distal portion of the tibia, wherein tibial torsion is defined by an angle between the third axis of symmetry and the fourth axis of symmetry, and providing the level of hip version and the level of tibial torsion to a user.

38 Claims, 30 Drawing Sheets

(56) References Cited

PUBLICATIONS

Belleman et al., "The Chitranjan Ranawat award: Is neutral mechanical alignment normal for all patients? The concept of constitutional varus", Clin Orthop Relat Res 2012; 470(1):45-53.

Bernasconi et al., "Comparison of Mechanical Axis of the Limb Versus Anatomical Axis of the Tibia for Assessment of Tibiotalar Alignment in End-Stage Ankle Arthritis", Foot Ankle Int. May 2021; 42(5):616-623.

Botser et al., "Femoral Anteversion in the Hip: Comparison of Measurement by Computed Tomography, Magnetic Resonance Imaging, and Physical Examination", Arthroscopy: The Journal of Arthroscopic and Related Surgery, vol. 28, No. 5 May 2012: 619-627.

Fabry et al., "Torsion of the femur. A follow-up study in normal and abnormal conditions", J Bone Joint Surg Am 1973; 55:1726-38.

Griffiths-Jones et al., "Arithmetic hip-knee-ankle angle (aHKA): An algorithm for estimating constitutional lower limb alignment in the arthritic patient population", Bone Joint Open 2021; 2-5:351-358.

Hoaglund et al., "Anatomy of the femoral neck and head, with comparative data from Caucasians and Hong Kong Chinese", Clin Orthop Relat Res 1980; 152:10-6.

Jacquemier et al., "Rotational profile of the lower limb in 1319 healthy children", Gait Posture 2008; 28:187-93.

Kate, B.R., "Anteversion versus torsion of the femoral neck", Acta Anat (Basel), 1978; 94 (3):457-63.

Litrenta et al., "Normative data on femoral version", Journal of Hip Preservation Surgery, 2018; vol. 5, No. 4, pp. 410-424.

Maderbacher et al., "Lower Limb Malrotation Is Regularly Present in Long-Leg Radiographs Resulting in Significant Measurement Errors", J Knee Surg Jan. 2021; 34(1):108-114.

Najefi et al., "Role of Rotation in Total Ankle Replacement", Foot Ankle Int Dec. 2019; 40(12):1358-1367.

Najefi et al., "Mechanical and anatomical axis of the lower limb in total ankle arthroplasty", Foot (Edinb). Sep. 2020; 44:101666. doi: 10.1016/j.foot.2020.101666. Epub Feb. 4, 2020.

Saikia et al., "Anthropometric study of the hip joint in northeastern region population with computed tomography scan", Indian J Orthop 2008; 42: 260-6.

International Search Report for PCT/US2022/046907 mailed Mar. 3, 2023 (Mar. 3, 2023), 16 pages.

Brainlab: "TRAUMACAD Software User GuideRevision 2.0", Dec. 31, 2019 (Dec. 31, 2019), pp. 1-162, XP055814580, Retrieved from the Internet: URL:https://www.traumacad.com/support/release/TraumaCad/2.5/Setup/Brainlab/Documents/TraumaCad_User_Guide_2.5.6.1004.pdf or https://userguides.brainlab.com/wp-content/uploads/2019/12/TraumaCad-2.5-OEM-SWUG-English-60916-49EN-Rev.2.0.pdf[retrieved on Jun. 16, 2021] pp. 70-72, pp. 97-109.

Mochizuki et al., "Extrinsic Factors as Component Positions to Bone and Intrinsic Factors Affecting Postoperative Rotational Limb Alignment in Total Knee Arthroplasty", The Journal of Arthroplasty, vol. 33, No. 7, pp. 2100-2110 (2018).

Radler et al., "Torsional profile versus gait analysis: Consistency between the anatomic torsion and the resulting gait pattern in patients with rotational malalignment of the lower extremity", Gait & Posture, vol. 32, No. 3, pp. 405-410 (2010).

Qi Xing et al., "Automatically Assessing Limb Alignment and Hip Fracture Using 3D Models", Computing in Science and Engineering, IEEE Service Center, vol. 15, No. 2, pp. 10-20 (2013).

Eckhoff, et al. "Bilateral Symmetrical Comparison of Femoral and Tibial Anatomic Features", The Journal of Arthroplasty, Elsevier, Amsterdam, NL. vol. 31, No. 5, Dec. 17, 2015, pp. 1083-1090.

Examination Report, Communication pursuant to Article 94(3) EPC for related Application No. 22806051.3 dated Oct. 1, 2025.

\* cited by examiner

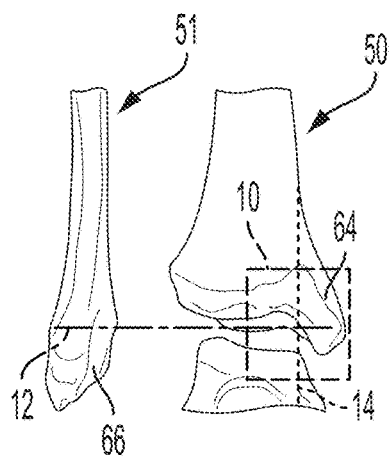 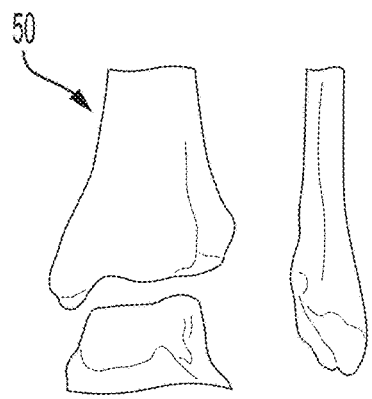
FIG. 14A  FIG. 14A´
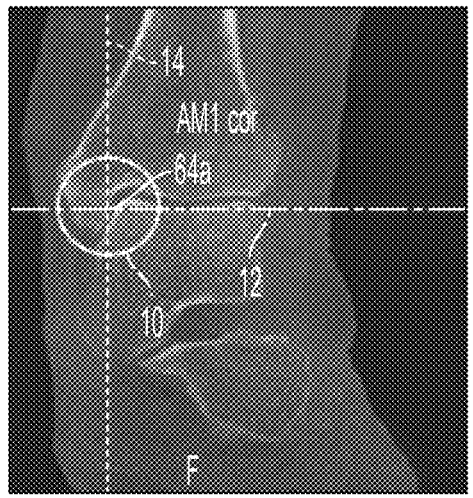
FIG. 14B
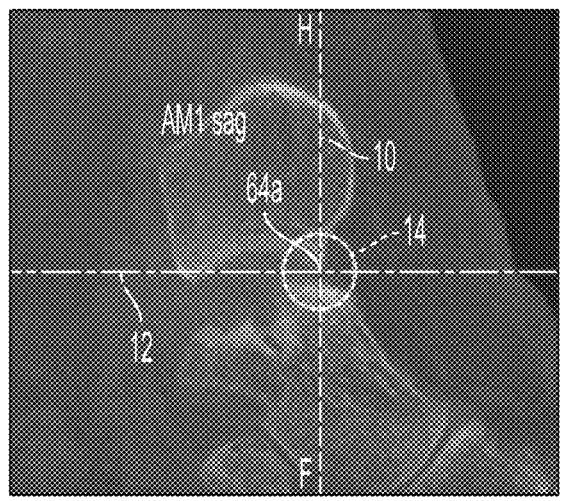 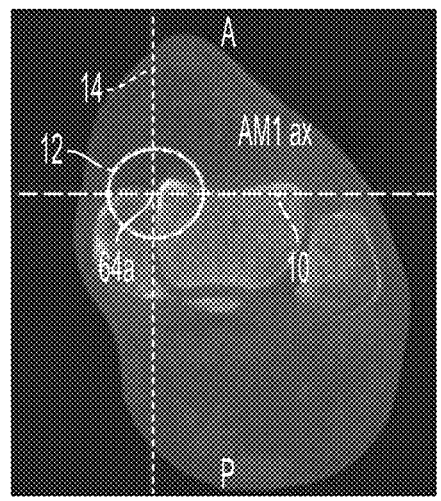
FIG. 14C  FIG. 14D

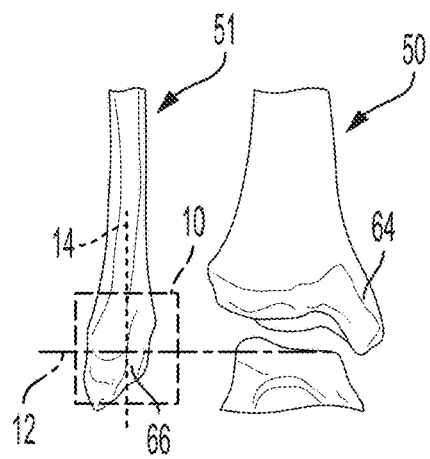 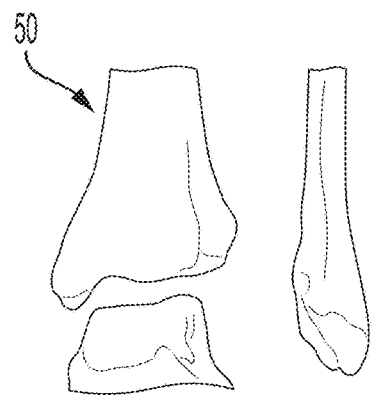
FIG. 16A          FIG. 16A´
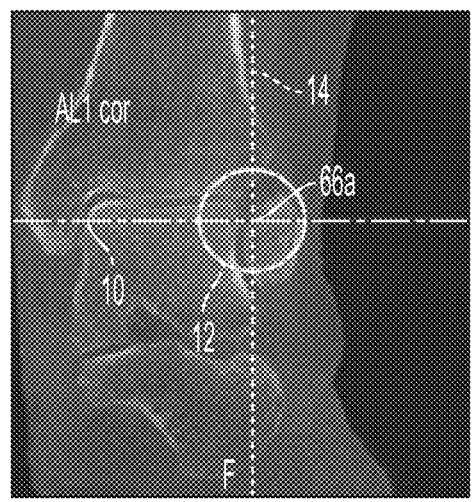
FIG. 16B
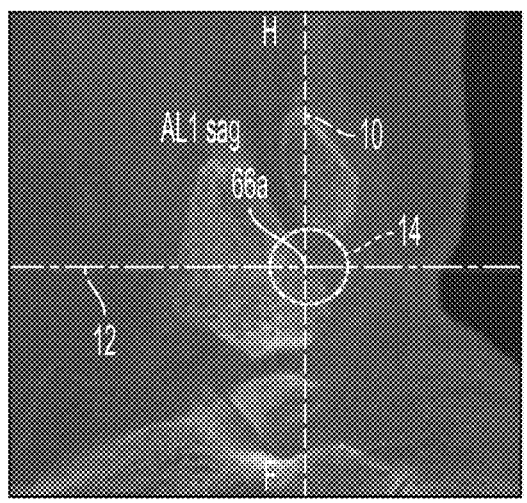 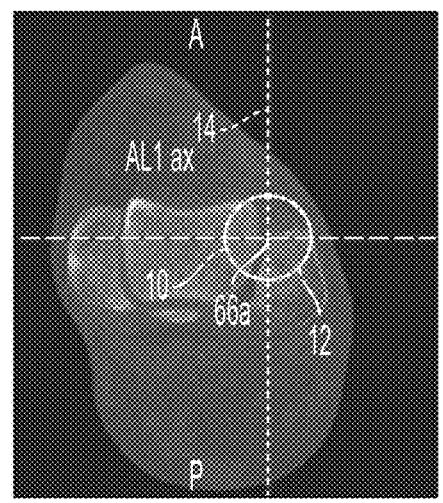
FIG. 16C          FIG. 16D

FOR MEASURING THE AXIAL (TRANSVERSE), CORONAL (FRONTAL) AND SAGITTAL (BISECTION) ALIGNMENT OF A LOWER LIMB

CROSS-REFERENCE TO RELATED APPLICATION

The present claims priority to and the benefit of U.S. Provisional Application No. 63/256,741 filed Oct. 18, 2021, the disclosure of which is incorporated herein by reference in its entirety.

BACKGROUND OF THE DISCLOSURE

The lower limb consists of a femur, a tibia and fibula, and a foot. Alignment of the lower limb is important for proper function, longevity of joints, avoidance of injury, and comfortable use of the lower limb. Misalignment of the lower limb can result in the opposite, i.e., improper function, deterioration of joints, susceptibility to injury, and discomfort when using the lower limb. Femoral version and tibial torsion are important factors when considering lower limb alignment.

Femoral version is the measurement of the orientation of the femoral neck in relation to the femoral condyles at the level of the knee. In most cases, the femoral neck is oriented anteriorly in the coronal (frontal) plane as compared to the posterior surface of the femoral condyles, to which the term femoral anteversion is applied. In the case of posterior orientation, the term femoral retroversion is applied.

The natural history of femoral anteversion is that infants are born with high femoral anteversion that decreases with age. Typically, at birth, femoral anteversion is 40° and decreases to 16° by skeletal maturity. There are observed population differences based on gender, with females having greater anteversion than males. Other series suggest that additional variation exist based on ethnicity.

Femoral version is a relevant measurement that affects hip range of motion and pathology. Significantly increased femoral anteversion affects the rotational profile of the lower extremity, leading to increased internal rotation and is associated with developmental dysplasia of the hip and is also associated with femoral acetabular impingement ("FAI") as well as hip osteoarthritis ("hip OA").

While high correlation was found between anteversion angle measurements by computed tomography ("CT") and magnetic resonance imaging ("MRI"), significant discrepancies in the absolute anteversion number implies that they may not be interchangeable. The lack of a high correlation to range of motion suggests that femoral anteversion may represent an incomplete or oversimplified description of the complex rotational anatomy of the hip.

Tibial torsion is the measurement of the twist or angulation of the tibia bone in a patient. Tibial torsion is often seen in children and in some cases adults. Tibial torsion can present as either inward torsion resulting in in-toeing (i.e., pigeon toeing) or outward torsion resulting in out-toeing.

Tibial torsion is a relevant measurement that affects pathology. Significant inward and/or outward tibial torsion affects the rotational profile of the lower extremity and is known to lead to pain and discomfort that can be experienced in the leg, hip, knee, and/or foot as well as instability of the foot and susceptibility to other injury.

In one study, CT data that was used to measure the relationship between the foot and the tibiotalar (ankle joint) showed major variation in patients undergoing ankle arthroplasty with external tibial torsion. In the study, 157 patients demonstrated an average of 34.5±10.3 degrees of external tibial torsion (with a range of 11.8-62°) (Ali-Asgar Najefi A, Malhotra K, Goldberg A J, Mechanical and anatomical axis of the lower limb in total ankle arthroplasty. Foot (Edinb). 2020 September; 44:101666. doi: 10.1016/j.foot.2020.101666. Epub 2020 Feb. 4).

Physicians use a hip-knee-ankle angle (HKA) which is a measurement of alignment of the lower limb. There is major variability in lower limb alignment in healthy subjects, and there is much interest in alignment of the lower limb in relation to total knee arthroplasty (TKA) surgery to restore constitutional 3D knee alignment and soft tissue balance after surgery. Studies have validated an arithmetic HKA (aHKA) algorithm to estimate the pre-arthritic constitutional alignment of the lower limb using long leg radiographs. The aHKA can represent the pre-arthritic alignment, providing there is no asymmetric bone loss. However, HKA implements two-dimensional radiographs which often are inaccurate to measure axial (transverse) plane alignment.

Coronal (or frontal) plane ankle joint alignment is typically assessed using the tibiotalar angle (TTA), which relies on the anatomical axis of the tibia (AAT) and the articular surface of the talus as landmarks. Often, the AAT differs from the mechanical axis of the lower limb (MAL) especially in cases of proximal deformity (genu valgum or varum) and post trauma and as such it has been recommended that a more accurate measurement is mechanical axis of the limb to the talar articular surface (MAL-TA).

In some instances, the foot will attempt to compensate or adapt for problems within the lower limb that present above the foot. For example, the foot may adapt for misalignment due to tibial torsion or hip version (e.g., knee varus or valgus). Whether compensation occurs in the foot or any other portion of the lower limb, negative pathologies may result including deterioration of joints, discomfort, restricted range of motion, and so forth.

Inadequate correction of alignment in the coronal, sagittal, or axial planes and failure to address soft tissue imbalances in joint replacement increases the risk of failure.

Because there is a poor understanding of axial alignment issues, it is likely that the etiology of many musculoskeletal (MSK) pathologies have been poorly understood. For example, patellofemoral disorders, pes planus, and lower limb soft tissue injuries, may be secondary to tibial torsion and/or hip version issues as may the development of unilateral joint arthritis.

What is needed are improved systems and methods of identifying axial alignment of lower limbs of a patient. More specifically intra-operator and inter-operator reliability is needed to provide accurate and reliable measurements of hip version and tibial torsion, either alone or in combination.

SUMMARY

According to one example ("Example 1"), a method of determining axial alignment of a lower limb, includes determining a three-dimensional volume based on a scan of a lower limb of a patient; identifying a level of hip version by referring to a first axis of symmetry of a femoral neck and a second axis of symmetry of a distal portion of a femur, wherein hip version is defined by an angle between the first axis of symmetry and the second axis of symmetry; identifying a level of tibial torsion by referring to a third axis of symmetry of a proximal portion of a tibia and a fourth axis of symmetry of a distal portion of the tibia, wherein tibial torsion is defined by an angle between the third axis of symmetry and the fourth axis of symmetry; and providing the level of hip version and the level of tibial torsion to a user.

According to another example ("Example 2"), further to Example 1, the step of identifying the axes of symmetry of the femoral neck, the distal portion of the femur, the proximal portion of the tibia, and the distal portion of the tibia includes the identifying the axis of symmetry by referring to the two-dimensional shapes or three-dimensional shapes of the lower limb in images from the scan.

According to another example ("Example 3"), further to Example 1, the step of identifying the axis of symmetry of the femoral neck, the distal portion of the femur, the proximal portion of the tibia, and the distal portion of the tibia includes identifying the axis of symmetry by referring to reference points on the lower limb in images from the scan.

According to another example ("Example 4"), further to any one of Examples 1-3, the angle between the first axis and the second axis is compared in a single plane.

According to another example ("Example 5"), further to any one of Examples 1-4, the scan is a single scan of an entirety of the lower limb.

According to another example ("Example 6"), further to any one of Examples 1-5, the scan is taken when the patient is weight bearing.

According to another example ("Example 7"), further to any one of Examples 1-6, the method further includes providing a relationship of the patient's level of hip version and tibial torsion to a predetermined level of hip version and tibial torsion.

According to another example ("Example 8"), further to any one of Examples 1-7, the method further includes displaying to a user alignment of the lower limb, wherein the alignment is displayed by overlaying the first axis with the second axis, the third axis, and the fourth axis.

According to an example ("Example 9"), a method of determining axial alignment of a lower limb includes positioning a patient; scanning a lower limb of a patient to produce images including sections in a frontal plane, sections in a sagittal plane, and sections in a transverse plane; obtaining a level of hip version based on the images; and obtaining a level of tibial torsion based on the images, wherein the level of hip version and the level of tibial torsion is mapped in three-dimensional space.

According to another example ("Example 10"), further Example 9, the method further includes aligning the images by viewing an image in the transverse plane through a pelvis of the patient at a height of an anterior iliac spine of the iliac crest, wherein aligning includes rotating the image in the transverse plane for symmetry.

According to another example ("Example 11"), further to any one of Examples 9-10, the step of obtaining the level of hip version includes determining a femoral neck angle based on a position of a center of a femoral head relative to a center of a base of a femoral neck, wherein the positions of the center of the femoral head and the center of the base of the femoral neck are identified in three-dimensional space in a first image set and a second image set, respectively, wherein each of the first and second image set includes an image in the frontal plane, the sagittal plane, and the transverse plane.

According to another example ("Example 12"), further to any one of Examples 9-11, the step of obtaining the level of hip version further includes determining a distal femoral angle based on a position of a posterior position of a medial femoral condyle or epicondyle to a posterior position of a lateral femoral condyle or epicondyle, respectively, wherein the posterior position of the medial femoral condyle or epicondyle and posterior position of the lateral femoral condyle or epicondyle are identified in three-dimensional space in a third image set and a fourth image set, respectively, wherein each of the third and fourth image set includes an image in the frontal plane, the sagittal plane, and the transverse plane.

According to another example ("Example 13"), further to any one of Examples 9-12, the step of obtaining the level of tibial torsion includes determining a proximal tibial angle relating to an axis of rotation of a proximal end of a tibia, wherein the proximal tibial angle is based on a position of an anterior position of a medial tibial condyle to an anterior position of a lateral tibial condyle, wherein the anterior position of the medial tibial condyle and anterior position of the lateral tibial condyle are identified in three-dimensional space in a fifth image set and a sixth image set, respectively, wherein each of the fifth and sixth image set includes an image in the frontal plane, the sagittal plane, and the transverse plane.

According to another example ("Example 14"), further to Example 13, the step of obtaining the level of tibial torsion includes determining a distal tibial angle relating to a line connecting a center of a first tangential line extending between outermost lateral surfaces of a medial malleolus and a second tangential line extending between innermost medial surfaces of a lateral malleolus.

According to another example ("Example 15"), further to Example 14, the step of identifying tibial torsion includes identifying a posterior position on the outermost lateral surfaces of the medial malleolus, an anterior position on the outermost lateral surfaces of the medial malleolus, a posterior position on the innermost medial surfaces of the lateral malleolus, and an anterior position on the innermost lateral surfaces of the medial malleolus in three-dimensional space in a seventh image set, an eighth image set, a ninth image set, and a tenth image set, respectively, wherein each of the seventh through tenth image set includes an image in the frontal plane, the sagittal plane, and the transverse plane.

According to an example ("Example 16"), a computer-implemented method for providing hip version and tibial torsion values includes receiving a plurality of images from a three-dimensional scan of at least one lower limb of a patient, the images including plurality of image sets, wherein the image sets each include an image in a frontal plane, and image in a sagittal plane, and an image in a transverse plane; determining a femoral neck axis by determining a center of a femoral head on a first image set and a center of a base of a femoral neck on a second image set; determining a distal femoral axis associated with an axis of rotation of a femur of a patient at a distal end of the femur, wherein the distal femoral axis is identified in a third image set and a fourth image set; determining an angle between the femoral neck axis and the distal femoral axis, wherein the angle between the femoral neck axis and the distal femoral axis is representative of hip version; determining a proximal tibia axis associated with an axis of rotation of a tibia of the patient at a proximal end of the tibia, wherein the proximal tibia axis is identified in a fifth image set and a sixth image set; determining a distal tibia axis associated with an axis of rotation of the tibia of the patient at a distal end of the tibia, wherein the distal tibia axis is identified in a seventh image set, an eighth image set, a ninth image set, and a tenth image set; and determining an angle between the proximal tibia axis and the distal tibia axis or a transmalleolar axis, wherein the angle between the proximal tibia axis and the distal tibia axis or transmalleolar axis is representative of tibial torsion.

According to another example ("Example 17"), further to Example 16, the step of determining the femoral neck axis includes providing a shape on the first three-image set and the second three-image set, wherein the shape is representative of a three-dimensional shape.

According to another example ("Example 18"), further to Example 17, the step of determining the femoral neck axis includes sizing the shape to a largest size which is capable of being positioned within the base of the femoral neck and such that the shape is shown contacting cortices of the base of the femoral neck in at least two images of the second image set.

According to another example ("Example 19"), further to any one of Examples 16-18, the step of determining the femoral neck axis includes finding a centroid of the femoral head and a centroid of the base of the femoral neck.

According to another example ("Example 20"), further to any one of Examples 16-18, the step of determining the femoral neck axis includes determining and selecting the center of the femoral head and the center of the base of the femoral neck on the first and second image sets, wherein the first and second image sets are selected from a plurality of image sets.

According to another example ("Example 21"), further to any one of Examples 16-18, the step of determining the center of the femoral head, determining the center of the base of the femoral neck, determining the distal femoral axis, determining the proximal tibia axis, and determining the distal tibia axis is accomplished by a computer system including software module, and wherein software module is programmed to make the determinations based on previous training on a plurality of samples.

According to an example ("Example 22"), a computing device for providing hip version and tibial torsion values, include one or more processors; and a memory storing instructions that, when executed by the one or more processors, cause the one or more processors to: determine a three-dimensional volume based on a scan of a lower limb of a patient; identify a level of hip version by referring to a first axis of symmetry of a femoral neck and a second axis of symmetry of a distal portion of a femur, wherein hip version is defined by an angle between the first axis of symmetry and the second axis of symmetry; identify a level of tibial torsion by referring to a third axis of symmetry of a proximal portion of a tibia and a fourth axis of symmetry of a distal portion of the tibia, wherein tibial torsion is defined by an angle between the third axis of symmetry and the fourth axis of symmetry; and provide the level of hip version and the level of tibial torsion to a user.

According to another example ("Example 23"), further to Examples 22, the step of identifying the axes of symmetry of the femoral neck, the distal portion of the femur, the proximal portion of the tibia, and the distal portion of the tibia includes the identifying the axis of symmetry by referring to the two-dimensional shapes or three-dimensional shape of the lower limb in images from the scan.\

According to another example ("Example 24"), further to Example 22, the step of identifying the axis of symmetry of the femoral neck, the distal portion of the femur, the proximal portion of the tibia, and the distal portion of the tibia includes identifying the axis of symmetry by referring to reference points on lower limb in images from the scan.

According to another example ("Example 25"), further to any one of Examples 22-24, the angle between the first axis and the second axis is compared in a single plane.

According to another example ("Example 26"), further to any one of Examples 22-25, the scan is a single scan of an entirety of the lower limb.

According to another example ("Example 27"), further to any one of Examples 22-26, the scan is taken when the patient is weight bearing.

According to another example ("Example 28"), further to any one of Examples 22-27, the method implemented further includes providing a relationship of the patient's level of hip version and tibial torsion to a predetermined level of hip version and tibial torsion.

According to another example ("Example 29"), further to any one of Examples 22-28, the method implemented further includes displaying to a user alignment of the lower limb, wherein the alignment is displayed by overlaying the first axis with the second axis, the third axis, and the fourth axis.

According to an example ("Example 30"), a non-transitory computer-readable medium having computer-readable instructions stored thereon for providing hip version and tibial torsion values, the instructions when executed by one or more processors of a computing device, cause the computing device to: determine a three-dimensional volume based on a scan of a lower limb of a patient; identify a level of hip version by referring to a first axis of symmetry of a femoral neck and a second axis of symmetry of a distal portion of a femur, wherein hip version is defined by an angle between the first axis of symmetry and the second axis of symmetry; identify a level of tibial torsion by referring to a third axis of symmetry of a proximal portion of a tibia and a fourth axis of symmetry of a distal portion of the tibia, wherein tibial torsion is defined by an angle between the third axis of symmetry and the fourth axis of symmetry; and provide the level of hip version and the level of tibial torsion to a user.

According to another example ("Example 31"), further to Example 30, the step of identifying the axes of symmetry of the femoral neck, the distal portion of the femur, the proximal portion of the tibia, and the distal portion of the tibia includes the identifying the axis of symmetry by referring to the two-dimensional shapes or three-dimensional shape of the lower limb in images from the scan.

According to another example ("Example 32"), further to Example 30, the step of identifying the axis of symmetry of the femoral neck, the distal portion of the femur, the proximal portion of the tibia, and the distal portion of the tibia includes identifying the axis of symmetry by referring to reference points on lower limb in images from the scan.

According to another example ("Example 33"), further to any one of Examples 30-32, the angle between the first axis and the second axis is compared in a single plane.

According to another example ("Example 34"), further to any one of Examples 30-33, the scan is a single scan of an entirety of the lower limb.

According to another example ("Example 35"), further to any one of Examples 30-34, the scan is taken when the patient is weight bearing.

According to another example ("Example 36"), further to any one of Examples 30-35, the method further includes providing a relationship of the patient's level of hip version and tibial torsion to a predetermined level of hip version and tibial torsion.

According to another example ("Example 37"), further to any one of Examples 30-36, method further includes displaying to a user alignment of the lower limb, wherein the alignment is displayed by overlaying the first axis with the second axis, the third axis, and the fourth axis.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIGS. 14A and 14A' are illustrations of the front and back, respectively, of a distal portion of a tibia, fibula, and an ankle joint with various planes shown at an anterior portion of a medial malleolus, in accordance with an embodiment;

FIGS. 14B-14D are images of a scan in the various planes identified in FIG. 12A, in accordance with an embodiment;

FIG. 16A is an illustration of a distal portion of a tibia, fibula, and an ankle joint with various planes shown at an anterior portion of a lateral malleolus, in accordance with an embodiment;

FIGS. 16B-16D are images of a scan in the various planes identified in FIG. 16A, in accordance with an embodiment;

DETAILED DESCRIPTION

Definitions and Terminology

Figure 1:
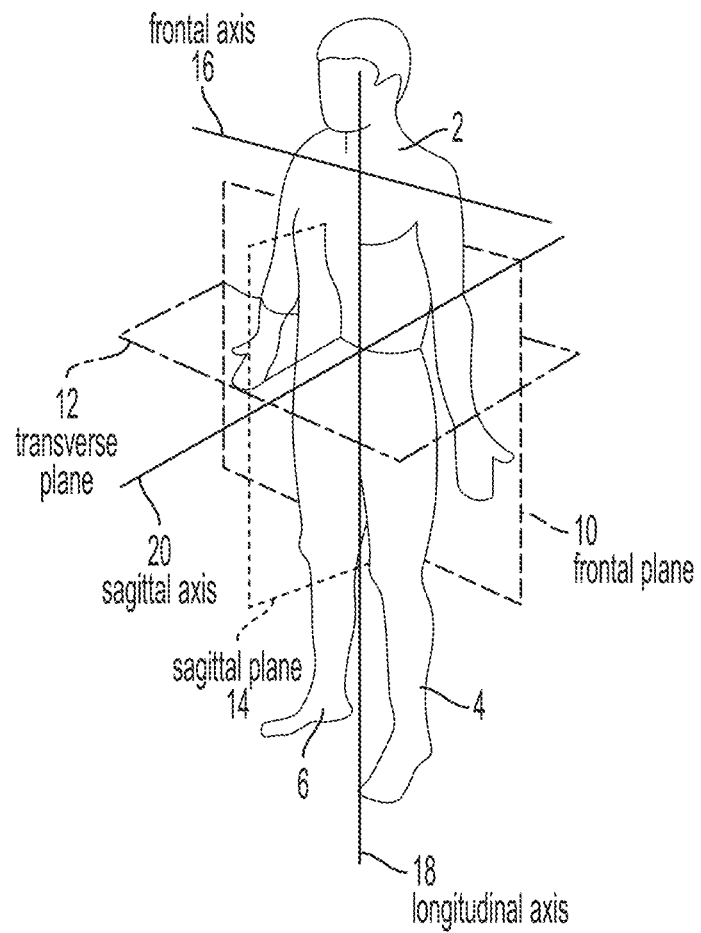
FIG. 1 is an illustration of a patient with reference planes and axes, in accordance with an embodiment.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

According to reported studies, approximately 25% of knee replacement patients are dissatisfied after knee replacement as judged by clinical and quality of life scores. One reason for dissatisfaction may be axial malalignment between the femoral and tibial components leading to poor patellofemoral tracking. The methods discussed herein enable surgeons to have pre- and post-operative measurements that act as a radiological biomarker for both diagnosis and to help guide treatment.

Femoral version is described as the relationship between the distal femur and the femoral neck. Traditionally the hips are anteverted by about 15° to about 20°. Retroversion is traditionally thought of as facing backwards. However, if femoral version is 5 degrees forwards this would still be referred to as anteversion. As used herein, the term "relative retroversion" and "relative hip retroversion" refers to the condition in which the hips are still facing posteriorly by 5° to 10° compared to normal and, although still facing forwards, are relatively retroverted. As best understood, relative femoral retroversion is associated with labral tears and FAI and ultimately hip OA.

There is an association between axial malalignment and flat foot. Traditionally, flat feet (pes planus) are treated with orthotic insoles (e.g., arch supports), alluding to the root cause being in the feet. However, in a proportion of patients, the problem may begin proximally at the hips or in the tibia, as axial malalignment leads to relative internal rotation of the ankle joint, which then leads to adjustments at the subtalar joint. In essence, as the tibia internally rotates the subtalar joint everts and a reciprocal motion at the Chopart's joints places the foot into a flatter position. In these patients, orthotic insoles are less effective and may even worsen the symptoms by transferring loads up the kinetic chain. For some patients, the solution may be surgical correction of the axial malalignment rather than insoles.

However, it is less clear how malalignment in hip version might affect joints or tissue below the hip and knee, for example, the ankle joint, and conversely how tibial torsion might affect joints or tissue above the ankle and knee, for example, the hip joint. Preliminary data relating to different pathologies suggest that malalignment does create problems in other joints, damage to other tissue, or decreased positive outcomes in interventions. For example, retroversion of the hip or arthritis in the hip may lead to adverse outcomes when an ankle fusion is performed. In another example, pes planus (or progressively collapsing foot deformity) may lead to hip pathology.

The present disclosure provides methods and systems for implementing a method for measuring alignment of a lower limb (e.g., the axial (transverse), coronal (frontal) and sagittal (bisection) alignment). Generally, a method of determining axial alignment of a lower limb may include the steps of determining a three-dimensional volume based on a scan of a lower limb of a patient; identifying a level of hip version by referring to a first plurality of reference points within the three-dimensional volume relating to a femoral neck and a second plurality of reference points relating to a distal portion of the femur, wherein hip version is defined by a relationship between the first plurality of reference points and the second plurality of reference points; identifying a level of tibial torsion by referring to a third plurality of reference points within the three-dimensional volume relating to a proximal portion of the tibia and a fourth plurality of reference points relating to a distal portion of the tibia, wherein tibial torsion is defined by a relationship between the third plurality of reference points and the fourth plurality of reference points; and providing the level of hip version and the level of tibial torsion to a user.

In some embodiments, the method includes providing a first line generally representative of an axis of the femoral neck, the first line generally corresponding with the first plurality of reference points (e.g., the first line defined by at least two of the plurality of reference points), and a second line generally representative of an axis of rotation of the distal portion of the fibula, the second line generally corresponding to the second plurality of reference points (e.g., the second line defined by at least two of the plurality of reference points). In some embodiments, the method may include providing a third line generally representative of an axis of rotation of the proximal portion of the tibia, the third line generally corresponding to the third plurality of reference points (e.g., the third line defined by at least two of the plurality of reference points), and a fourth line generally representative of an axis of rotation of the distal portion of the tibia, the fourth line generally corresponding to the fourth plurality of reference points (e.g., the fourth line defined by at least two of the plurality of reference points). In some embodiments, the method includes calculating the angle between the first line and the second line and calculating the angle between the third line and the fourth line.

Various methods described herein may be implemented for determining the reference points, lines, and angles, which may be implemented either alone or in combination with the various embodiments described. For example, in some embodiments, specific anatomical positions (e.g., center of a femoral head, condyles, etc.) may be identified, wherein those positions are recorded as reference points. It is understood that positions and reference points as described herein may be used interchangeably to discuss the actual anatomical positions as well as an indicator or data as recorded by a system implementing the methods. The various methods may generally include determining specific anatomical positions. The anatomical positions may be identified in a three-dimensional volume defined relative to a three-dimensional scan of the lower limb of the patient. This may be accomplished by identifying each position by reviewing images provided from the scan or by reviewing a three-dimensional model provided from the scan. When reviewing images, a single position may be identified in at least two images in different planes. For example, a single position may be identified in three images, the three images being in three planes (e.g., frontal plane, sagittal plane, and transverse plane). When reviewing a three-dimensional model, the positions may be identified directly in the three-dimensional model. These methods are described more fully, and it is understood that the general concepts described here may be implemented with respect to any of the specific positions discussed hereafter.

FIG. 1 is provided to demonstrate the various planes and axes as they relate to the human body, the planes and axes being discussed throughout the present disclosure. More specifically, this disclosure relates to a method to assess the degrees of axial malalignment (e.g., in the transverse plane) both for diagnosis and/or to help direct treatment. The method may be implemented using a system as described herein or on other systems capable of performing similar steps or providing similar outputs. The system and methods discussed herein provide an accurate and repeatable way to determine the hip version and tibial torsion of a patient. FIG. 1 illustrates the patient's body 2 having a left lower limb 4 and a right lower limb 6. A frontal pane 10 is shown in long dashed lines relative to the patient's body 2, a transverse plane 12 is shown in alternating long and short dashed lines relative to the patient's body 2, and the sagittal plane 14 is shown in short, dashed lines relative to the patient's body 2. All figures including a representation of the frontal plane 10, the transverse plane 12, and the sagittal plane 14 include the same dashed features for each of those planes throughout. A frontal axis 16, a longitudinal axis 18, and a sagittal axis 20 are each shown relative to the patient's body 2. The planes 10, 12, 14 and axes 16, 18, 20 are discussed throughout and the positions shown in FIG. 1 do not represent the exact position of the planes and axes, but instead are shown as a guide for orientation. It is understood that other terms are applicable to similar or equivalent concepts and the terms implemented herein are not intended to be limiting in scope. For example, the term "frontal plane" may also be understood as the "coronal plane".

In some embodiments, a computed tomography ("CT") scan is taken of a patient, the CT scan providing images of a patient in slices that represent the anatomy of the patient in three different planes (i.e., axial, sagittal, and coronal planes). Although a CT scan is discussed throughout, it is understood that other imagining techniques may be utilized in the methods described herein (e.g., magnetic resonance imaging). The method of determining axial alignment of a lower limb may include positioning a patient; scanning a lower limb of a patient to produce images including sections in a frontal plane, sections in a sagittal plane, and sections in a transverse plane; obtaining a level of hip version based on the images; and obtaining a level of tibial torsion based on the images. The scans are taken in various formats including weight bearing scans or supine scans. It is generally understood that the scan discussed herein relates to a single scan of an entire lower limb or a single scan of both lower limbs in their entireties. Although multiple scans may be implemented in the methods and systems described herein, it is understood that in some embodiments, the single scan provides a more accurate view of the alignment of the limbs than multiple scans since movements of the user between scans, which is typical, would provide inaccurate measurements regarding alignment between the various positions discussed herein.

Figure 2:
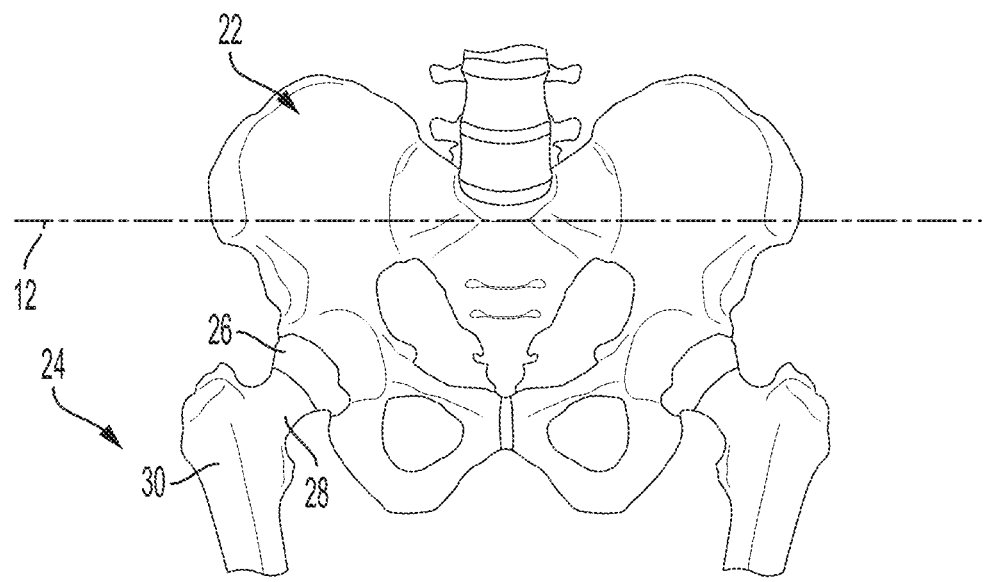
FIG. 2 is an illustration of a pelvis and a proximal portion of a femur, in accordance with an embodiment.
Figure 3A:
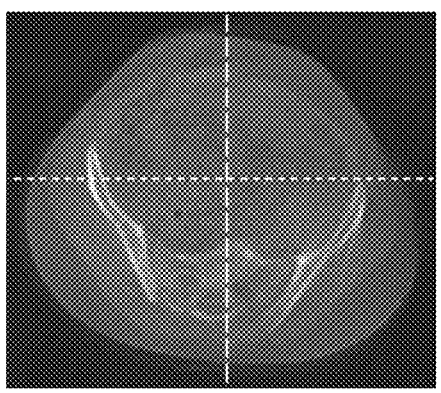
FIG. 3A is an image of a scan shown in a transverse plane at a position shown of the transverse plane in FIG. 2, in accordance with an embodiment.
Figure 3B:
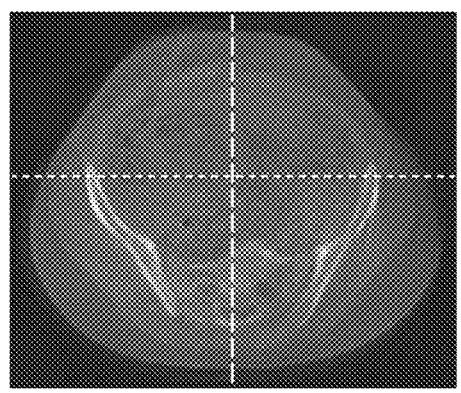
FIG. 3B is the image of the scan of FIG. 3A which has been aligned, in accordance with an embodiment.

In some embodiments, prior to determining axial alignment of the lower limbs, the method includes aligning the images and/or dataset. For example, and with reference to FIGS. 2, 3A, and 3B, the dataset is aligned for best possible symmetry when projected onto the coronal plane (e.g., images showing a section in the transverse plane 12). This allows for angular measurement comparisons between the left and right lower limbs 4, 6. Alignment of the dataset and/or images is achieved by viewing an image (e.g., an axial slice) in the transverse plane 12 through a pelvis 22 of the patient at a height of an anterior iliac spine of the iliac crest, wherein aligning includes rotating the image in the transverse plane 12 for symmetry. For example, FIG. 2 demonstrates a position at which an axial slice may be viewed (i.e., an axial slice in the transverse plane 12). With further reference to FIG. 2, a femur 24 is shown, the femur 24 including a femoral head 26, a femoral neck 28, and a femoral neck base 30. FIG. 3A shows the axial slice at the position shown in FIG. 2 (i.e., height of the anterior iliac spine of the iliac crest), wherein the axial slice shows the spinal segment off-axis. The dataset is then rotated such that the axial slice showing the spinal segment is aligned to show symmetry (e.g., left-to-right symmetry or symmetry across the sagittal plane). Once the dataset is aligned, the user (e.g., doctor, radiologist, healthcare professional, etc.) and/or the system (e.g., automated or semi-automated program run on a computer) may determine axial alignment of one or more of the lower limbs. Once alignment is achieved for the images and dataset, axial alignment may be determined for one or both lower limbs.

Turning to a discussion of determining a level of hip version, FIGS. 4A-10B demonstrate how to calculate hip version. For reference, FIGS. 10A and 10B demonstrate two anatomically representative lines as they relate to the native anatomy of a patient's femur. The angular relationship between these two anatomically representative lines provides a level of hip version. The first anatomically representative line indicates a femoral neck axis 32 and the second anatomically representative line indicates a distal femoral axis 34. FIGS. 4A-6B demonstrate how the femoral neck axis 32 is determined and FIGS. 7A-9B demonstrate how the distal femoral axis 34 is determined. Although lines are discussed herein, it is understood that the methods and system discussed herein may implement vectors or other representations as appropriate that correspond to the axes discussed herein.

Figure 4A:
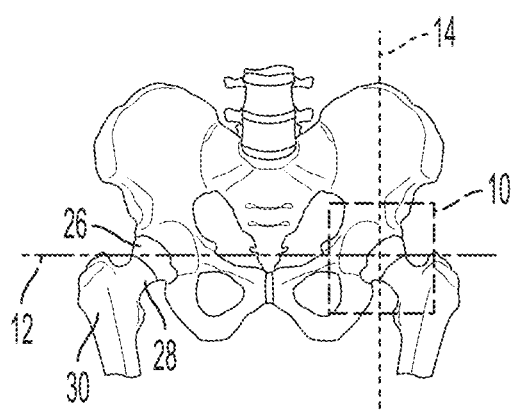
FIG. 4A is an illustration of a pelvis and a proximal portion of a femur with various planes shown at a femoral head, in accordance with an embodiment.

With reference to FIG. 4A, an exemplary pelvis 22 and proximal end of a femur 24 are illustrated. In order to determine a level of hip version, the femoral neck angle is determined by defining the position of the femoral neck axis 32. The femoral neck axis 32, and consequently the femoral neck angle, is based on a position of a center of the femoral head 26 relative to a center of a base of a femoral neck 28. The position of the various planes 10, 12, 14 in FIG. 4A represents the positions corresponding to the axial slices of FIGS. 4B-4D (e.g., a three-image set with an image in each plane). Thus, FIGS. 4A-4D relate to the femoral head 26. To determine the femoral neck axis 32, the center of the femoral head 26 is identified. The center of the femoral head is identified by correlating the center in three-dimensional space by identifying the center in a first image (i.e., FIG. 4B) in a frontal plane 10, a second image (i.e., FIG. 4C) in a sagittal plane 14, and a third image (i.e., FIG. 4D) in a transverse plane 12. The center of the head 26 of the femur 24 can be determined in a variety of ways. In some embodiments, the centroid of the head 26 of the femur 24 can be determined using mathematical analysis. In some embodiments, the center of the head 26 of the femur 24 can be determined by providing a three-dimensional shape within the dataset that would be accommodated within the head 26 of the femur. For example, a sphere may be represented in the dataset, wherein the sphere appears as a circle on the axial slices that are viewed by a user. It is understood that any appropriate shape may be implemented and a sphere is provided as only an example. The user and/or the system may dimension the sphere such that it fits or is accommodated within the cortex of the femoral head 26. As it relates to the axial slices, the sphere represented as a circle on each of the axial slices is positioned within the cortex of the femoral head 26. Once the circle in each of the axial slices is positioned within the femoral head 26, the center of the sphere (e.g., the center of the circle in each of the frontal, transverse, and sagittal planes) is defined as the center of the femoral head 26.

Figure 4B:
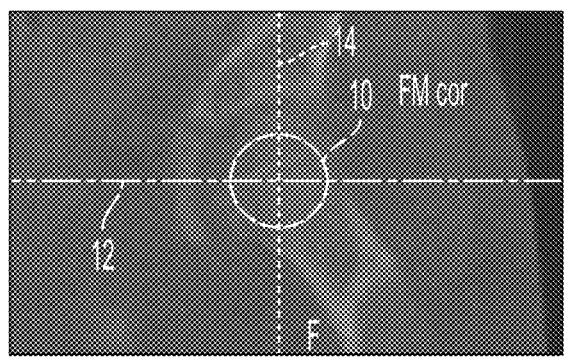
FIGS. 4B-4D are images of a scan in the various planes identified in FIG. 4A, in accordance with an embodiment.
Figure 4C:
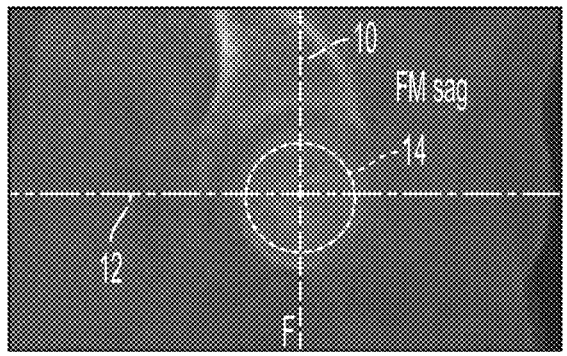
Figure 4D:
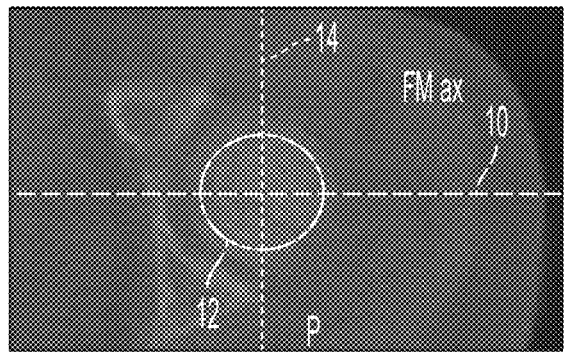

In some embodiments, identification of the center of the femoral head 26 is accomplished via a method (e.g., a computer implemented method) that allows a user to determine the center of the femoral head 26 by correlating frontal, transverse, and sagittal slices from a dataset, the slices represented by images in each of the frontal, transverse, and sagittal planes. For example, FIG. 4B represents an image in the frontal plane 10. The sphere is represented in the frontal plane 10 by the circle in the image of FIG. 4B. The other planes (transverse and sagittal planes 12, 14) are provided for reference as the lines also illustrated in FIG. 4B. As can be seen in FIG. 4B, the circle representing the sphere in the two-dimensional image is shown as the long-dashed line of the frontal plane 10. In FIG. 4C, the circle representing the sphere in the two-dimensional image is shown as the short-dashed line of the sagittal plane 14. The other planes (frontal and transverse planes 10, 12) are provided for reference as the lines also illustrated in FIG. 4C. In FIG. 4D, the circle representing the sphere in the two-dimensional image is shown as the alternating long and short dashed line of the transverse plane 12. The other planes (frontal and sagittal planes 10, 14) are provided for reference as the lines also illustrated in FIG. 4D. The circle in each of FIGS. 4B-4D are accommodated within the cortices of the femoral head 26.

Figure 5A:
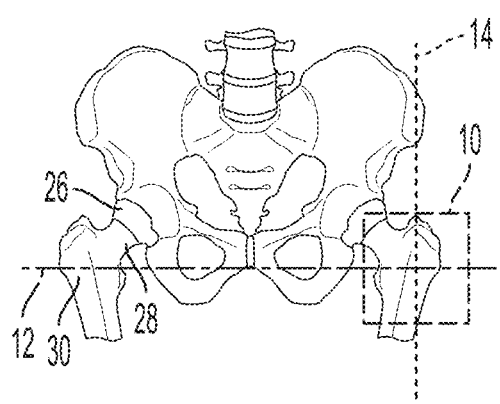
FIG. 5A is an illustration of a pelvis and a proximal portion of a femur with various planes shown at a base of femoral neck, in accordance with an embodiment.
Figure 5B:
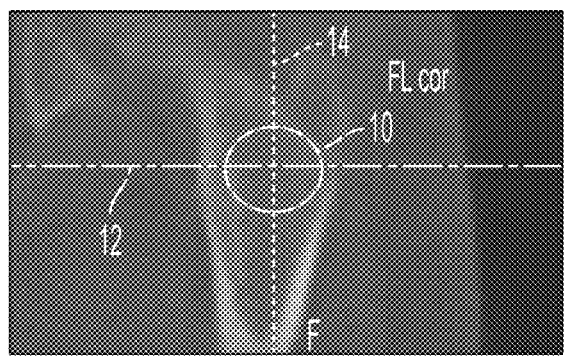
FIGS. 5B-5D are images of a scan in the various planes identified in FIG. 5A, in accordance with an embodiment.
Figure 5C:
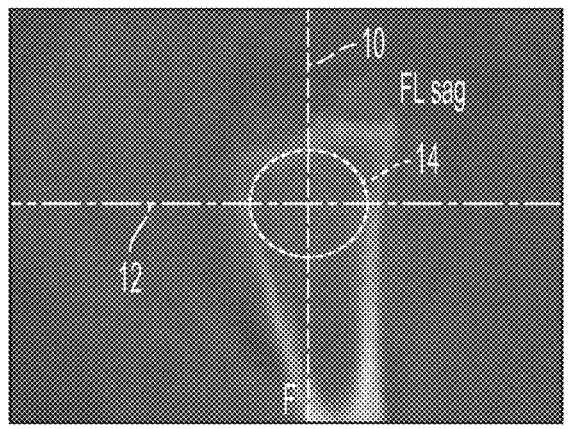
Figure 5D:
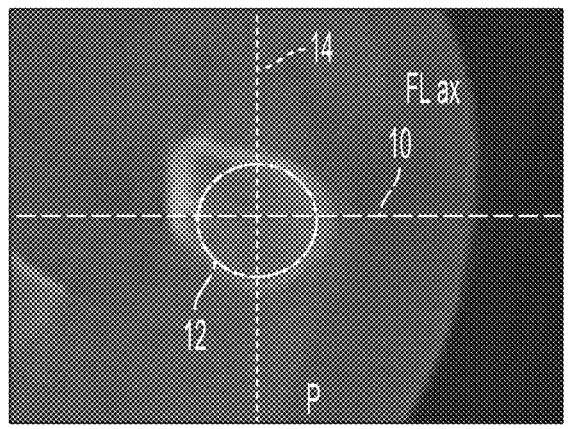

In some embodiments, identification of the femoral neck base 30 is accomplished via a method (e.g., a computer implemented method) that allows a user to determine the center of the femoral neck base 30 by correlating frontal, transverse, and sagittal slices from a dataset (e.g., a three-image set in each planes), the slices represented by images in each of the frontal, transverse, and sagittal planes. The center of the femoral neck base 30 is identified by correlating the center in three-dimensional space by identifying the center in a fourth image (i.e., FIG. 5B) in a frontal plane 10, a fifth image (i.e., FIG. 5C) in a sagittal plane 14, and a sixth image (i.e., FIG. 5D) in a transverse plane 12. The position of the various planes 10, 12, 14 can be seen in FIG. 5A and represents the positions corresponding to the axial slices of FIGS. 5B-5D, which all relate to the femoral neck base 30. With reference to FIG. 5B, a sphere is represented in the frontal plane 10 by a circle in the image of FIG. 5B. The other planes (transverse and sagittal planes 12, 14) are provided for reference as the lines also illustrated in FIG. 5B. As can be seen in FIG. 5B, the circle representing a sphere in the two-dimensional image is shown as the long-dashed line of the frontal plane 10. In FIG. 5C, a circle representing the sphere in the two-dimensional image is shown as the short-dashed line of the sagittal plane 14. The other planes (frontal and transverse planes 10, 12) are provided for reference as the lines also illustrated in FIG. 5C. In FIG. 5D, a circle representing the sphere in the two-dimensional image is shown as the alternating long and short dashed line of the transverse plane 12. The other planes (frontal and sagittal planes 10, 14) are provided for reference as the lines also illustrated in FIG. 5D. The circles in each of FIGS. 5B-5D are accommodated within the cortices of the femoral neck base 30. The center of each of the circles of FIGS. 5B-5D represent a single point in three-dimensional space. That single point represents the center of the sphere which identifies the center of the femoral neck base 30.

Figures 6A, 6B:
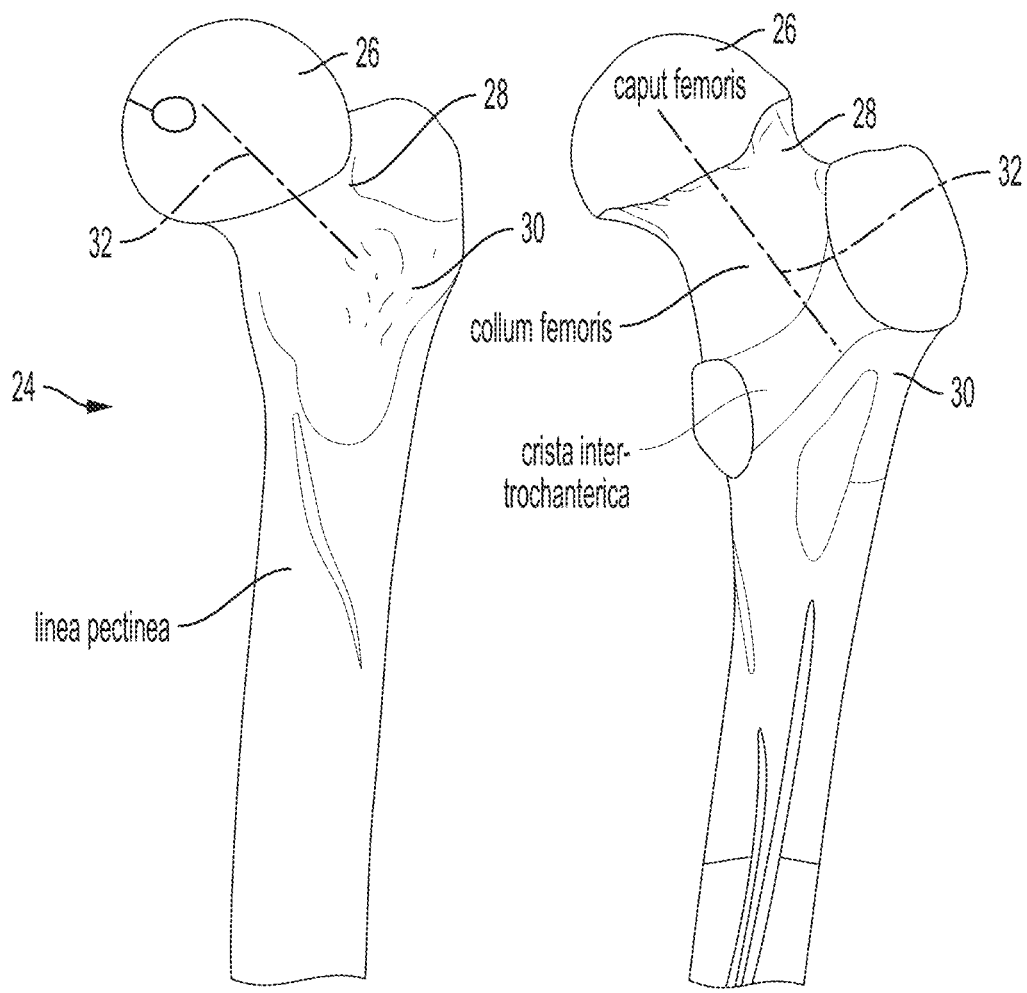
FIGS. 6A and 6B are illustrations of a proximal portion of a femur including a femoral neck axis, in accordance with an embodiment.

Referring to FIGS. 6A and 6B, once the position of the center of the femoral head 26 is determined and the position of the center of the femoral neck base 30 is determined, the femoral neck axis 32 can be determined. The femoral neck axis 32 extends between the center of the femoral head 26 and the center of the femoral neck base 30 (e.g., along and through the center of the femoral neck 28). In order to determine hip version, an angle between the femoral neck axis 32 and a distal femoral axis 40 (e.g., see FIGS. 9A and 9B), the relationship between the femoral neck axis 32 and the distal femoral axis 40 being shown in more detail in FIGS. 10A and 10B.

Referring to FIGS. 7A-9B, the distal femoral axis 34 generally represents an axis of rotation or an axis parallel to the axis of rotation of a distal portion of the femur 24. The distal portion of the femur 24 generally rotates along a curved surface of the condyles of the distal surface, the central point of the curved surface being defined by the condyles generally representing the axis of rotation. The surfaces of the condyles define the contact position and therefore generally are parallel with the axis of rotation of the distal portion of the femur 24. Accordingly, one method of determining the distal femoral axis 34 is to determine a line extending between the condyles of the distal portion of femur 24. On the three plane view, markers in the coronal plane are placed at the level of the upper margin of the femoral notch (which corresponds with the most prominent posterior distal femoral condylar elements).

Figure 7A:
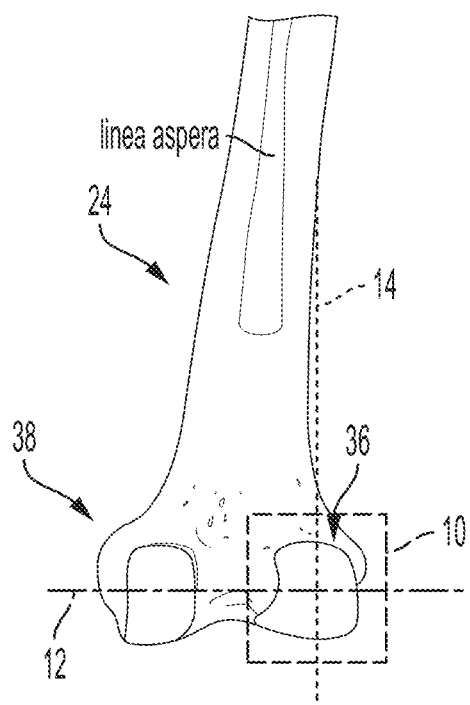
FIG. 7A is an illustration of a distal portion of a femur with various planes shown at a lateral condyle, in accordance with an embodiment.
Figure 7B:
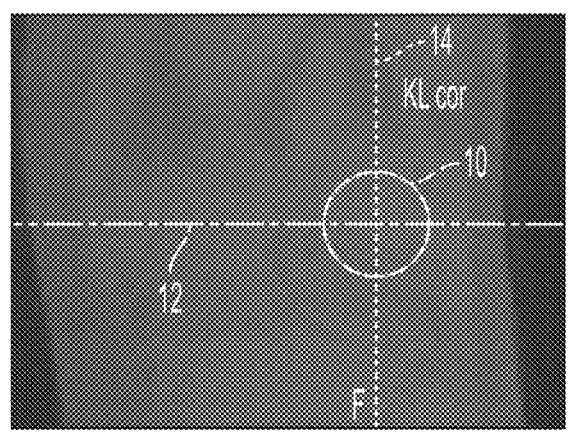
FIGS. 7B-7D are images of a scan in the various planes identified in FIG. 7A, in accordance with an embodiment.
Figure 7C:
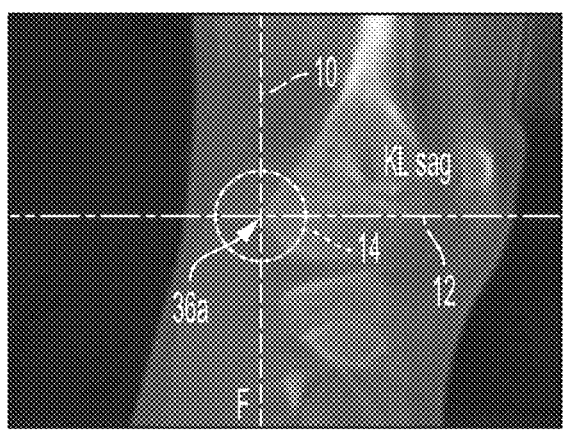
Figure 7D:
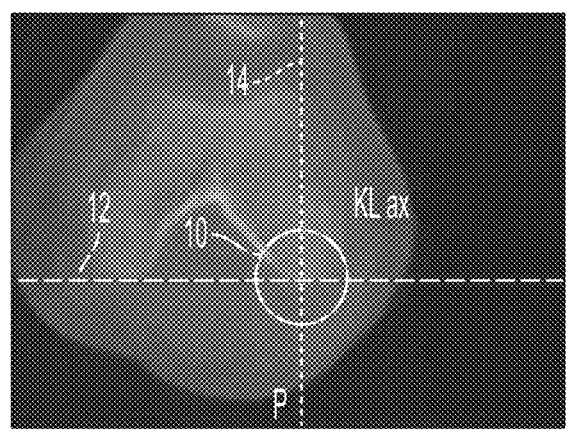

More specifically, with reference to FIG. 7A, the distal portion of the femur 24 is illustrated and includes a lateral femoral condyle 36 and a medial femoral condyle 38. The position of the various planes 10, 12, 14 in FIG. 7A represents the positions corresponding to the axial slices of FIGS. 7B-7D (e.g., a three-image set with an image in each plane). Based on the position of the axial slices shown in FIG. 7A, FIGS. 7A-7D relate to the medial femoral condyle 38. In order to determine the distal femoral axis 34, a position on the lateral femoral condyle 36 is identified. For example, as shown in FIGS. 7A-7D, an apex 36*a* of the lateral femoral condyle 36 is identified at a dorsal position of the femur 24. The apex 36*a* can be identified and correlated in each of the three images in the various planes (e.g., a three-images set in each of planes 10, 12, 14). By correlating the position of the apex 36*a* in the three images, a three-dimensional position is obtained for the apex 36*a* of the lateral femoral condyle 36.

Figure 8A:
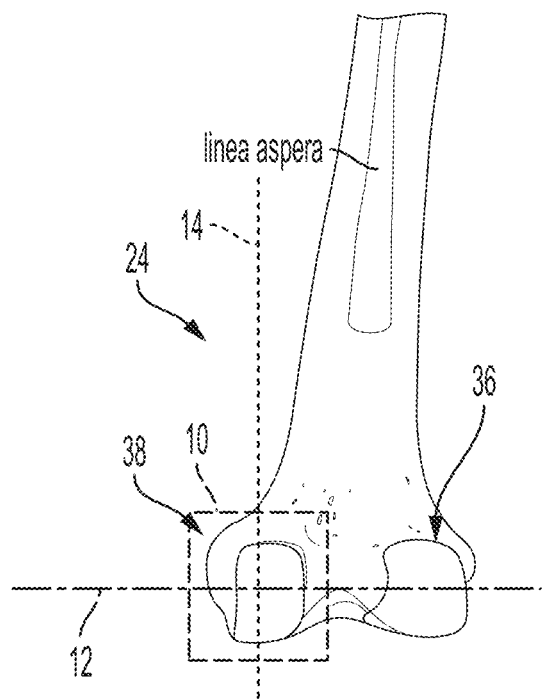
FIG. 8A is an illustration of a distal portion of a femur with various planes shown at a medial condyle, in accordance with an embodiment.
Figure 8B:
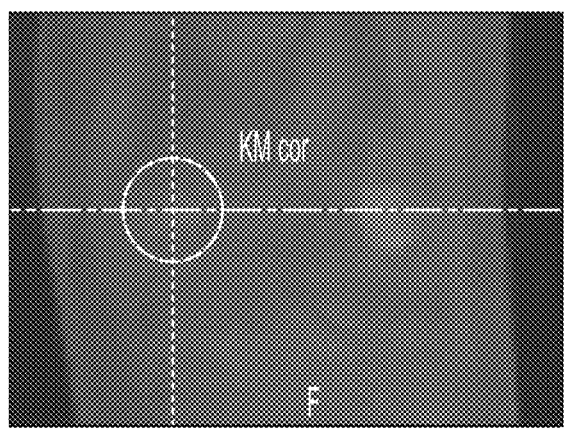
FIGS. 8B-8D are images of a scan in the various planes identified in FIG. 8A, in accordance with an embodiment.
Figure 8C:
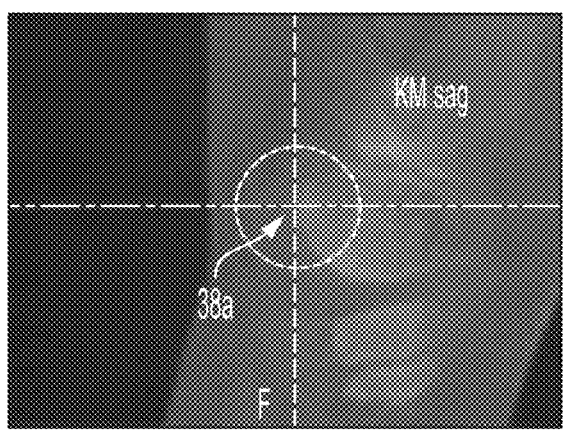
Figure 8D:
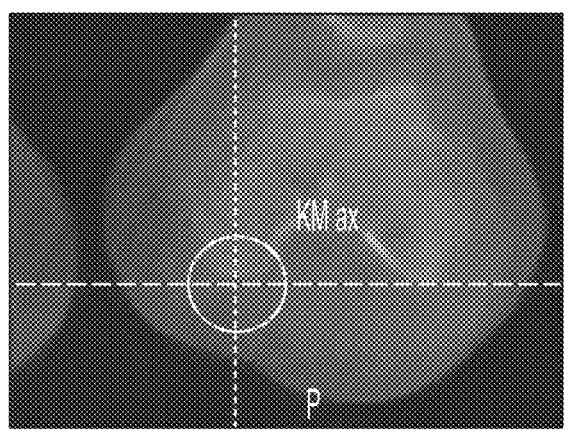

Referring to FIG. 8A, the distal portion of the femur 24 is illustrated and includes the lateral femoral condyle 36 and the medial femoral condyle 38. The position of the various planes 10, 12, 14 in FIG. 8A represents the positions corresponding to the axial slices of FIGS. 8B-8D (e.g., a three-image set with an image in each plane). Based on the position of the axial slices shown in FIG. 8A, FIGS. 8A-8D relate to the medial femoral condyle 38. In order to determine the distal femoral axis 34, a position on the medial femoral condyle 38 is identified. For example, as shown in FIGS. 8A-8D, an apex 38*a* of the medial femoral condyle 38 is identified at a dorsal position of the femur 24. The apex 38*a* can be identified and correlated in each of the three images in the various planes (e.g., a three-images set in each of planes 10, 12, 14). By correlating the position of the apex 38*a* in the three images, a three-dimensional position is obtained for the apex 38*a* of the medial femoral condyle 38.

Figures 9A, 9B:
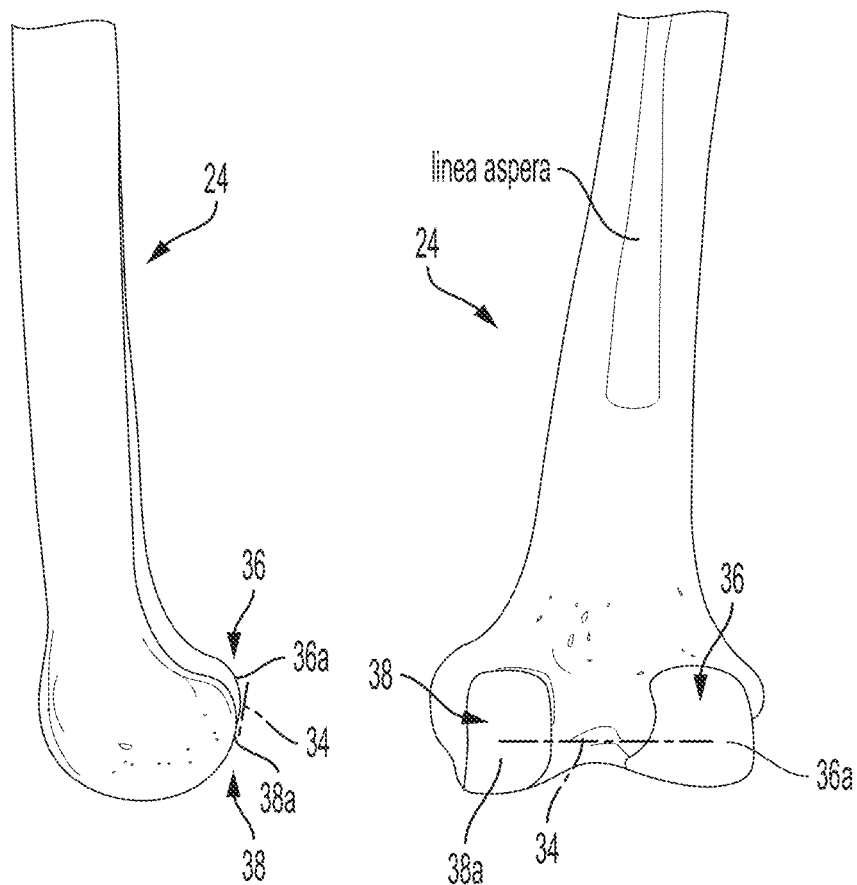
FIGS. 9A and 9B are illustrations of a proximal portion of a femur including a distal femoral axis, in accordance with an embodiment.

Referring to FIGS. 9A and 9B, once the apices 36*a*, 38*a* of the lateral and medial condyles 36, 38 are identified on the dorsal portion on a distal portion of the femur 24, the distal femoral axis 34 can be determined. The distal femoral axis 34 extends between the apices 36*a*, 38*a* of the lateral and medial condyles 36, 38. The distal femoral axis 34 is generally parallel to the axis of rotation of the distal portion of the femur 24. The distal femoral axis 34 as determined in the method described, when represented in the axial plane, generally indicates the femoral condylar axis.

Figures 10A, 10B:
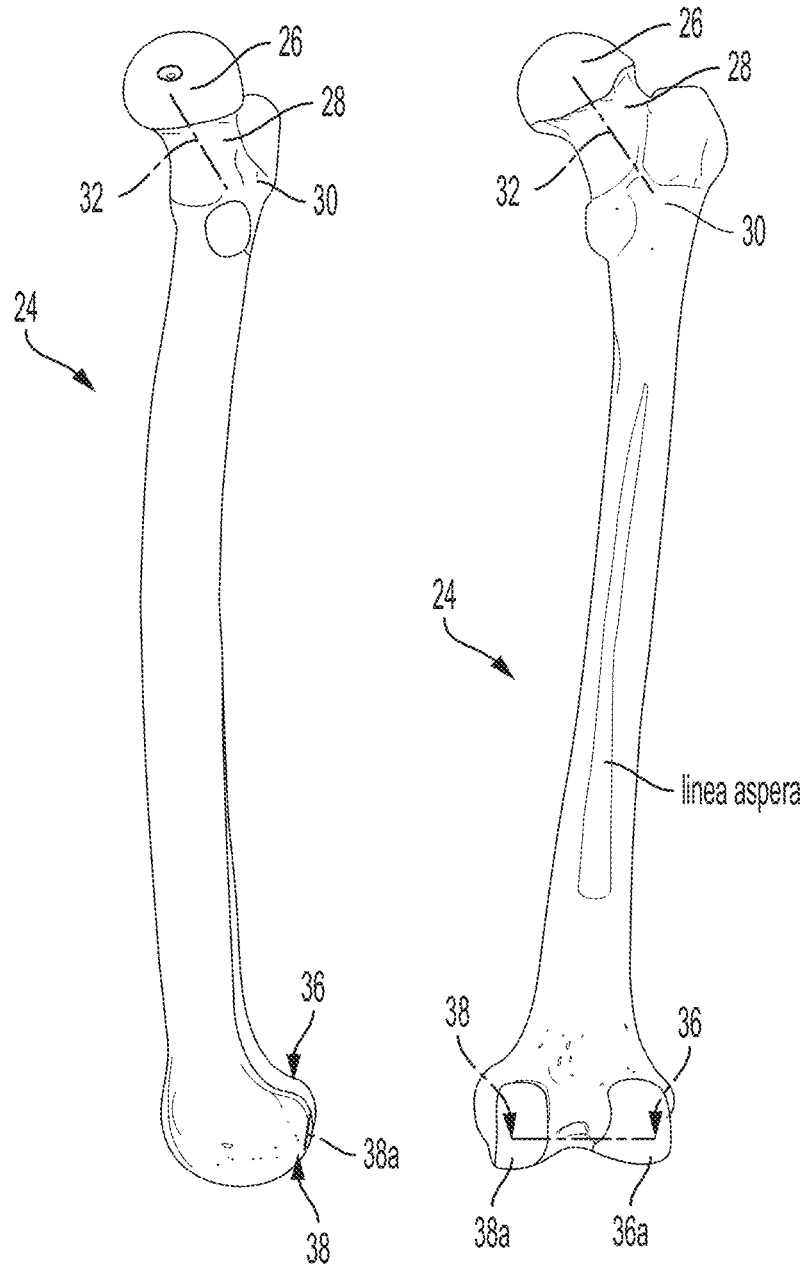
FIGS. 10A and 10B are illustrations of a proximal portion of a femur including a femoral neck axis and distal femoral axis, in accordance with an embodiment.

Referring to FIGS. 10A and 10B, the level of hip version may then be calculated by determining the relationship between the femoral neck axis 32 and the distal femoral axis 34. More specifically, the angular relationship is of interest in determining the level of hip version. For example, hip version may be defined as the relationship between the femoral neck axis 32 and the distal femoral axis 34 in the transverse plane. When the femoral neck axis 32 is anterior to the distal femoral axis 34 in the transverse plane, the orientation is referred to as anteversion. Otherwise, the relationship between the femoral neck axis 32 and the distal femoral axis 34 is referred to as retroversion and is expressed in degrees.

It is understood that the methods described throughout may include defining a three-dimensional space within which the points described may be mapped. The three-dimensional space may include a coordinate system within which each of the described points and positions may be defined. For example, the center of the femoral head 26 may be assigned a coordinate within the coordinate system (X, Y, and Z values to describe the three-dimensional position within the coordinate system), the center of the femoral neck base 30 may be assigned a coordinate within the coordinate system, the apex 36a of the lateral femoral condyle 36 may be assigned a coordinate within the coordinate system, and the apex 38a of the medial femoral condyle 38 may be assigned a coordinate with the coordinate system. The femoral neck axis 32 and the distal femoral axis 34 may be mapped within the coordinate system. In this way, the relationship between the femoral neck axis 32 and the distal femoral axis 34 may be easily ascertained and calculated based on the coordinate system.

Figure 20A:
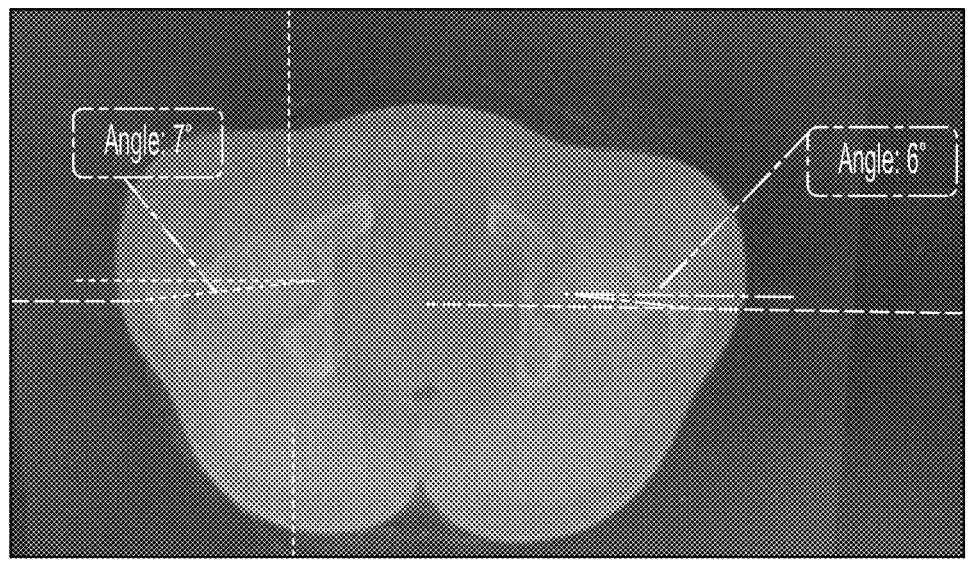
FIGS. 20A and 20B are images of a scan showing aligning a scan, in accordance with an embodiment.
Figure 20B:
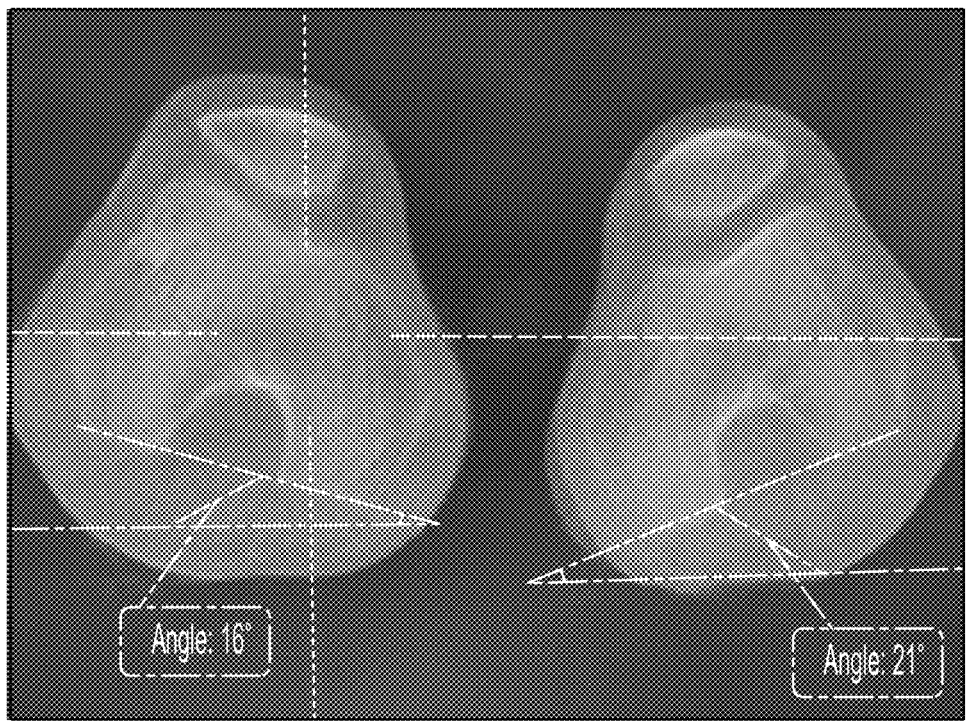

In another embodiment and with reference to FIGS. 20A and 20B, hip version may be determined by manually drawing a line from the center of the femoral head 26 to the central bisection of the proximal femoral condyles (corresponding to the center of the femoral neck 28). A second line is drawn parallel to the distal femoral condyles 36, 38 in the transverse plane, at the level of the mid-section of the knee condyles in the frontal plane. These images and lines are then superimposed over one another. There are two methods that can be used, either directly by measuring the bones over two different axial slices at once (one at hip level and one at knee level) or by taking two separate angle measurements using a horizontal line as a static reference on either slice and subsequently adding or subtracting the resulting angles, depending on their orientation/direction. The angle between the drawn lines is recorded as the hip version measurement in degrees. If the angle is anterior then it is known as hip anteversion. If the angle is posterior then it is known as hip retroversion.

Referring now to FIGS. 11A-19, a method for determining tibial torsion is provided. Tibial torsion is defined as the angle between a line connecting both posterior condyles of the tibia (i.e., the proximal tibial axis 46) and the line bisecting the articular surfaces of the medial and lateral malleoli, i.e., the transmalleolar axis 48 (hereinafter "TMA"). The TMA 48 relates to the distal tibial axis and therefore may be used interchangeably throughout. A further line is drawn along the most prominent point of the medial third of the tibial tuberosity, and the TMA. The identification of these positions is described in greater detail herein.

Referring more specifically to FIGS. 11A-13, the position of the proximal tibial axis 46 is illustrated. For example, a proximal end of a tibia 50 is shown. The proximal end of the tibia 50 includes a lateral, posterior tibial condyle 52 and a medial, posterior tibial condyle 54. The proximal tibial axis 46 is defined between a similar position on each of the lateral, posterior tibial condyle 52 and the medial, posterior tibial condyle 54. The proximal tibial axis 46 generally represents an axis of rotation or an axis parallel to the axis of rotation of a proximal portion of the tibia 50. The proximal portion of the tibia 50 generally rotates along a curved surface of the condyles of the proximal surface, the central point of the curved surface being defined by the condyles generally representing the axis of rotation. The surfaces of the condyles define the contact position and therefore generally are parallel with the axis of rotation of the proximal portion of the tibia 50. Accordingly, one method of determining the proximal tibial axis 46 is to determine a line extending between the condyles of the proximal portion of tibia 50.

As previously discussed, a three-dimensional scan is taken of the patient's lower limb(s). Using the images and/or data produced by three-dimensional scan, a positioned can be identified or defined (either through a manual or automated process) within the data and/or images. In some embodiments, the images are centered around the knee of the patient. The three-dimensional position of three-image sets for the proximal portion of the tibia 50 is initially provided at about 1 mm proximal to the fibula head in the coronal plane (e.g., one slice above the fibula head).

Figure 11A:
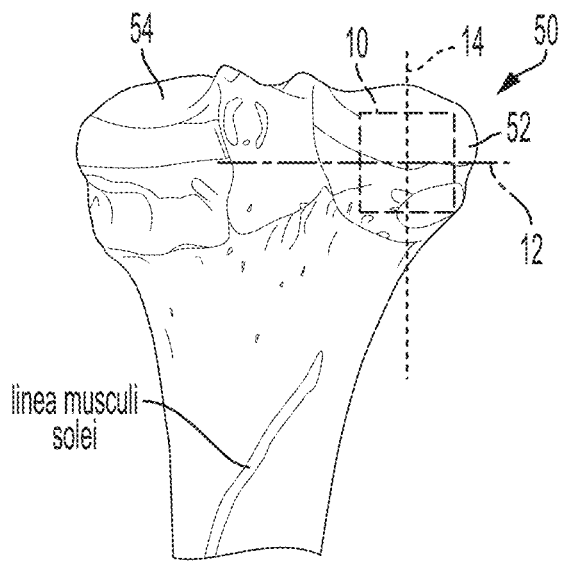
FIG. 11A is an illustration of a proximal portion of a tibia with various planes shown at a lateral condyle, in accordance with an embodiment.
Figure 11B:
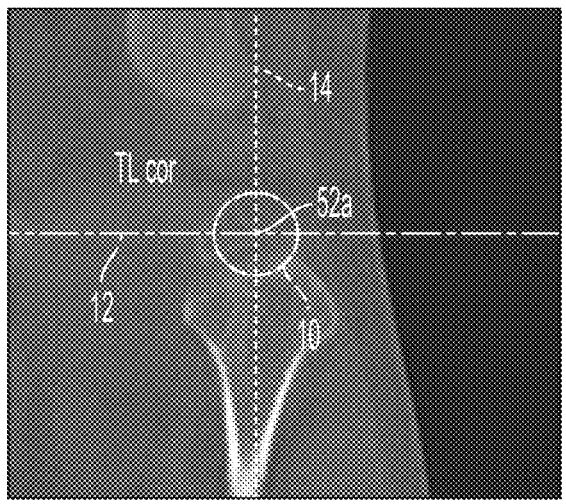
FIGS. 11B-11D are images of a scan in the various planes identified in FIG. 11A, in accordance with an embodiment.
Figure 11C:
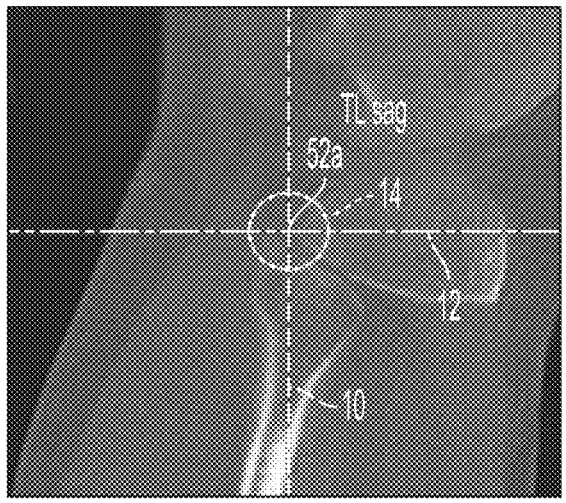
Figure 11D:
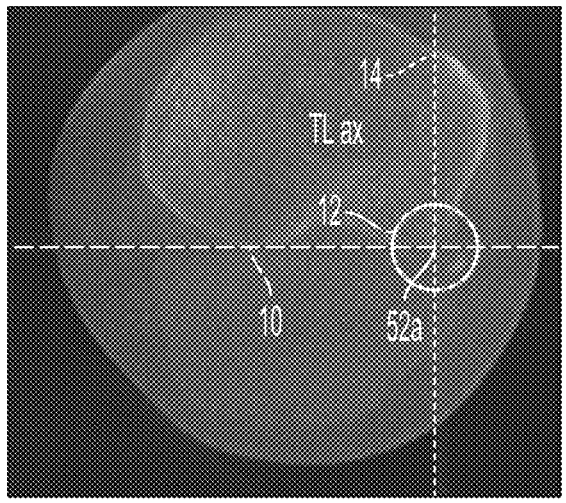

More specifically, with reference to FIG. 11A, the proximal portion of the tibia 50 is illustrated and includes the lateral, posterior tibial condyle 52 and the medial, posterior tibial condyle 54. The position of the various planes 10, 12, 14 in FIG. 11A represents the positions corresponding to the axial slices of FIGS. 11B-11D (e.g., a three-image set with an image in each plane). Based on the position of the axial slices shown in FIG. 11A, FIGS. 11A-11D relate to the lateral, posterior tibial condyle 52. In order to determine the proximal tibial axis 46, a position on the lateral, posterior tibial condyle 52 is identified. For example, as shown in FIGS. 11A-11D, an apex 52a of the lateral, posterior tibial condyle 52 is identified at a dorsal position of the tibia 50. The apex 52a can be identified and correlated in each of the three images in the various planes (e.g., a three-images set in each of planes 10, 12, 14). By correlating the position of the apex 52a in the three images, a three-dimensional position is obtained for the apex 52a of the lateral, posterior tibial condyle 52.

Figure 12A:
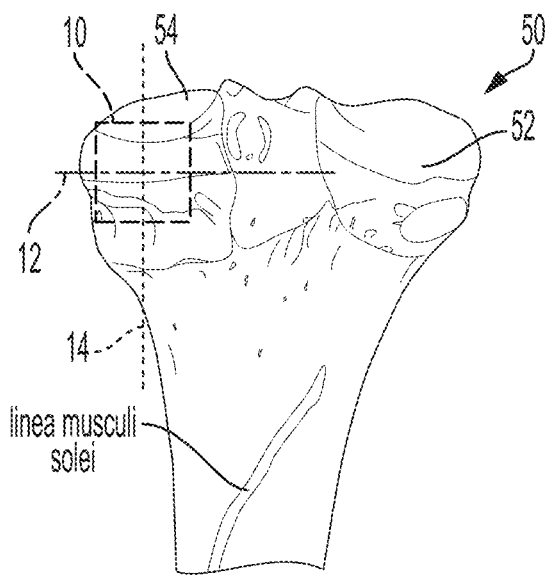
FIG. 12A is an illustration of a proximal portion of a tibia with various planes shown at a medial condyle, in accordance with an embodiment.
Figure 12B:
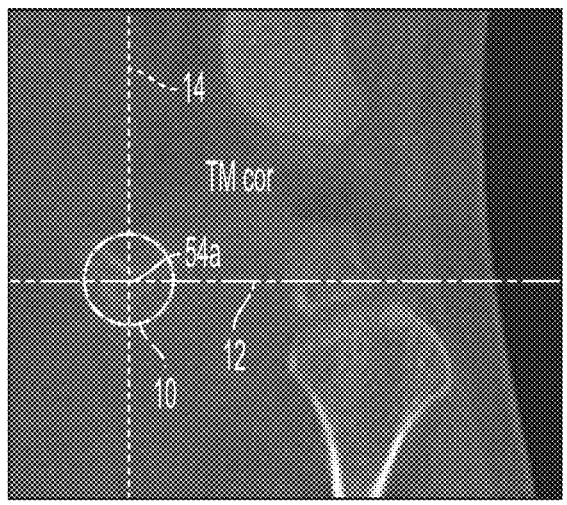
FIGS. 12B-12D are images of a scan in the various planes identified in FIG. 12A, in accordance with an embodiment.
Figure 12C:
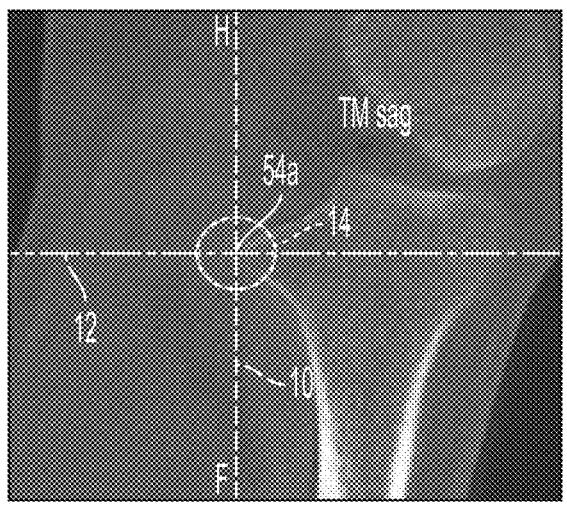
Figure 12D:
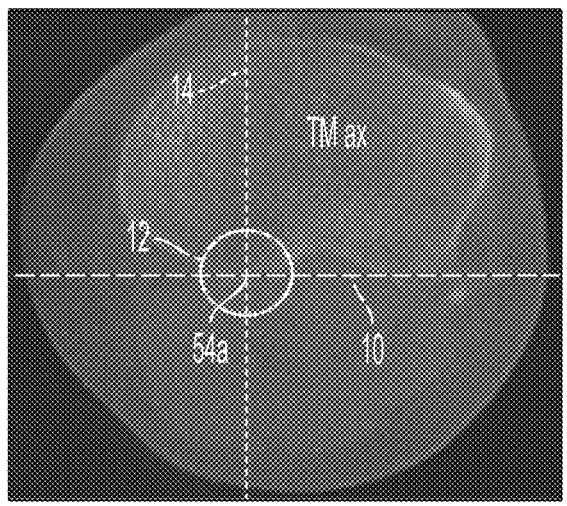

Referring to FIG. 12A, the proximal portion of the tibia 50 is illustrated and includes the lateral, posterior tibial condyle 52 and the medial, posterior tibial condyle 54. The position of the various planes 10, 12, 14 in FIG. 12A represents the positions corresponding to the axial slices of FIGS. 12B-12D (e.g., a three-image set with an image in each plane). Based on the position of the axial slices shown in FIG. 12A, FIGS. 12A-12D relate to the medial, posterior tibial condyle 54. In order to determine the proximal tibial axis 46, a position on the medial, posterior tibial condyle 54 is identified. For example, as shown in FIGS. 12A-12D, an apex 54a of the medial, posterior tibial condyle 54 is identified at a dorsal position of the tibia 50. The apex 54a can be identified and correlated in each of the three images in the various planes (e.g., a three-images set in each of planes 10, 12, 14). By correlating the position of the apex 38a in the three images, a three-dimensional position is obtained for the apex 52a of the medial, posterior tibial condyle 54.

Figure 13:
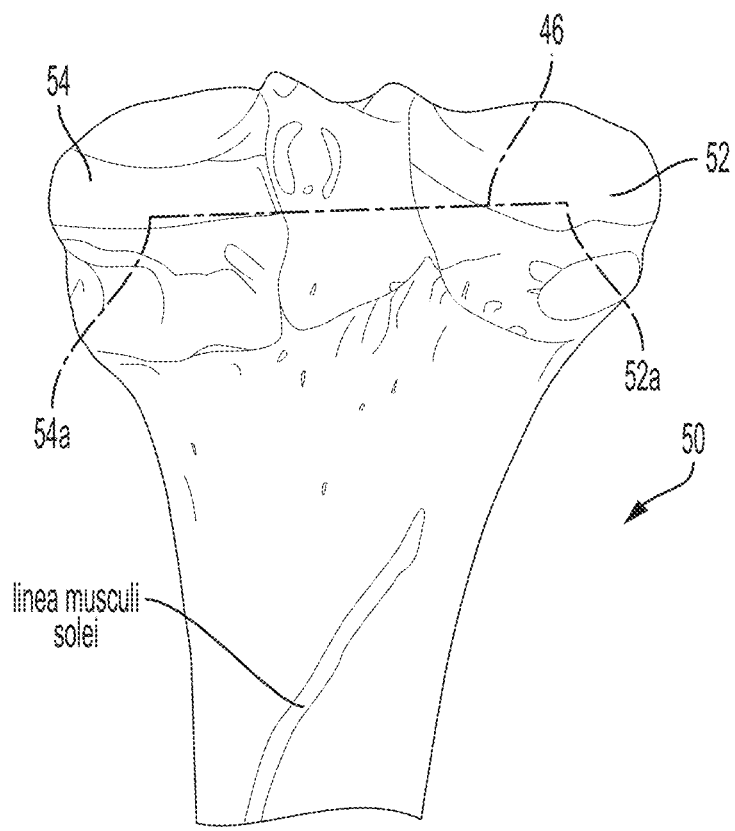
FIG. 13 is an illustration of a proximal portion of a tibia including a proximal tibial axis, in accordance with an embodiment.
Figure 15A:
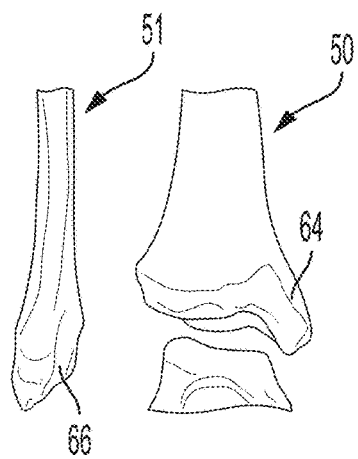
FIGS. 15A and 15A' are illustrations of the front and back, respectively, of a distal portion of a tibia, fibula, and an ankle joint with various planes shown at a dorsal portion of a lateral malleolus, in accordance with an embodiment.
Figure 15A:
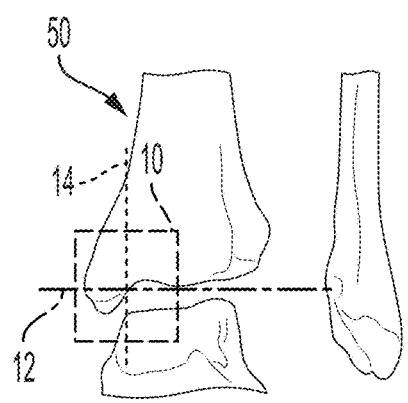
Figure 15B:
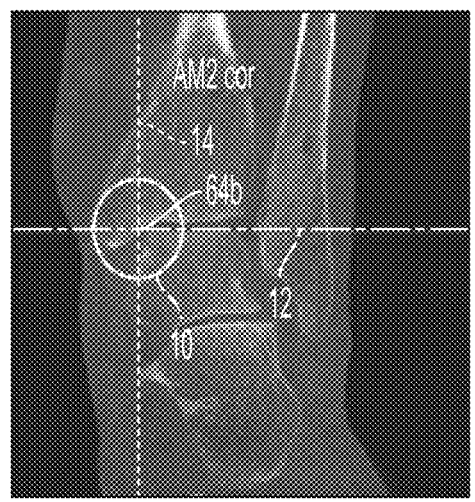
FIGS. 15B-15D are images of a scan in the various planes identified in FIG. 15A, in accordance with an embodiment.
Figure 15C:
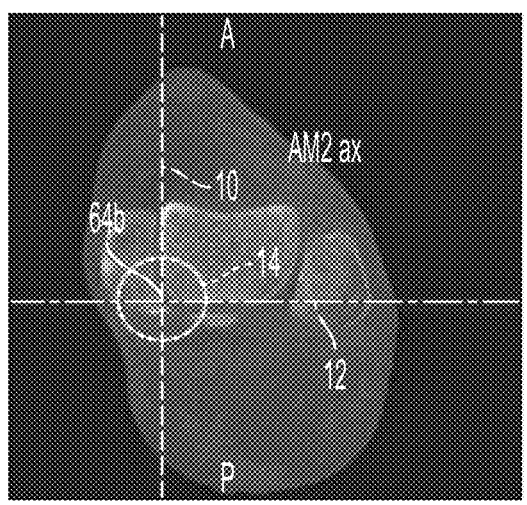
Figure 15D:
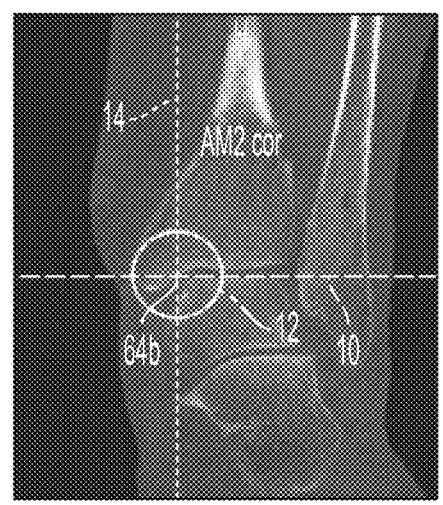
Figure 17A:
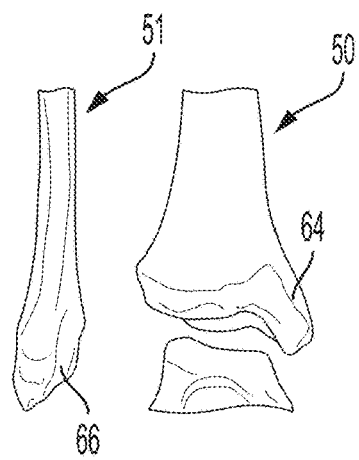
FIGS. 17A and 17A' are illustrations of the front and back, respectively, of a distal portion of a tibia, fibula, and an ankle joint with various planes shown at a dorsal portion of a lateral malleolus, in accordance with an embodiment.
Figure 17A:
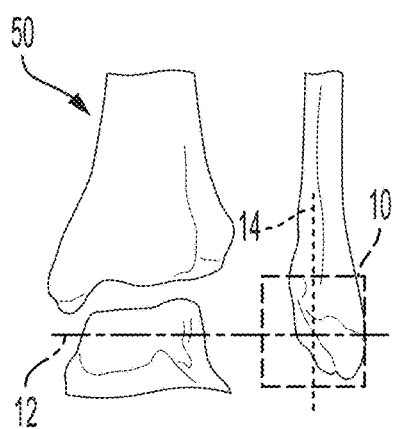
Figure 17B:
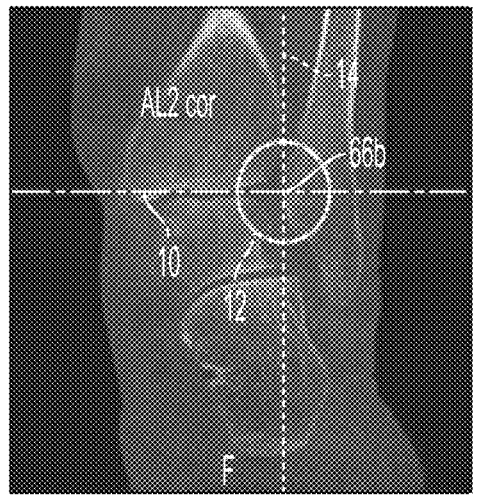
FIGS. 17B-17D are images of a scan in the various planes identified in FIG. 17A, in accordance with an embodiment.
Figure 17C:
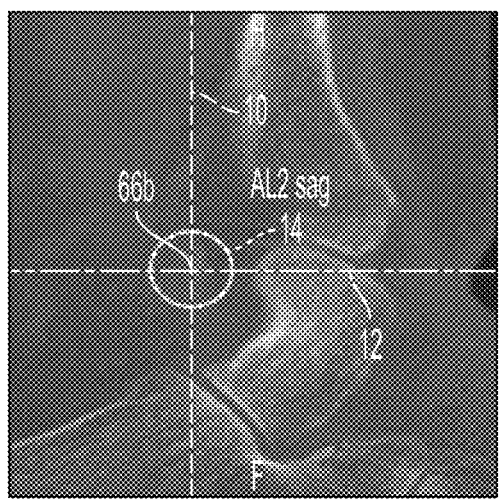
Figure 17D:
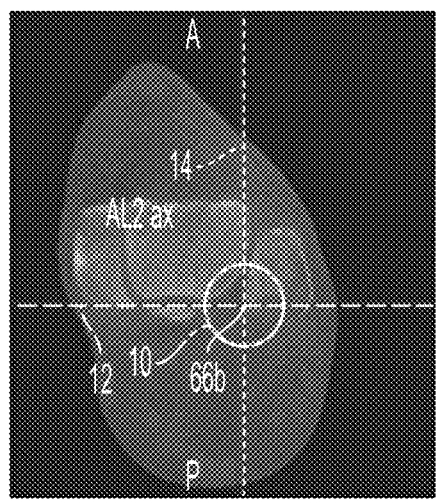

Referring to FIG. 13, once the apices 52a, 54a of the lateral and medial, posterior tibial condyles 52, 54 are identified on the dorsal portion on a proximal portion of the tibia 50, the proximal tibial axis 46 can be determined. The proximal tibial axis 46 extends between the apices 52a, 54a of the lateral and medial, posterior tibial condyles 52, 54. The proximal tibial axis 46 is generally parallel to the axis of rotation of the proximal portion of the tibia 50. The proximal tibial axis 46 as determined in the method described, when represented in the axial plane, generally indicates the tibial condylar axis.

Referring now to FIGS. 14A-18C, the position of the TMA 48 is determined by identifying various anatomical positions relating to the ankle of the patient. As previously discussed the TMA 48 relates to an axis extending between a bisection of a medial malleolar axis 60 and a lateral malleolar axis 62. As each of the medial malleolar axis 60 and the lateral malleolar axis 62 are needed to determine the TMA 48, description of how the medial malleolar axis 60 and the lateral malleolar axis 62 are identified and defined are provided herein.

Referring to FIGS. 14A-15D, the positions defining the medial malleolar axis 60 are provided. More specifically, FIGS. 14A and 14A' show the back and a front view, respectively, of a distal portion of a tibia 50, as well as a distal portion of a fibula 51, with the same views provided in FIGS. 15A, 15A', 16A, 16A', 17A, and 17A' to orient the positions shown in the associated images. Referring more specifically to FIGS. 14A-15D, in order to determine the medial malleolar axis 60, positions relating to the structure of the medial malleolus 64 are identified. The structure of the medial malleolus 64 in combination with the lateral malleolus 66 of the fibula 51 dictates an axis of rotation of the distal portion of the tibia 50 as it relates to the ankle joint, and therefore may be implemented to define the TMA 48.

In some embodiments, the medial malleolar axis 60 may be generally defined between an anterior medial malleolar edge 64a and a dorsal medial malleolar edge 64b. Referring to FIGS. 14A-14D, a distal end of a tibia 50 is shown, wherein the figures generally relate to the anterior medial malleolar edge 64a. The position of the various planes 10, 12, 14 in FIG. 14A represent the positions corresponding to the axial slices of FIGS. 14B-14D (e.g., a three-image set with an image in each plane). As indicated by the position of the axial slices shown in FIG. 14A, FIGS. 14A-14D illustrated the position of the anterior medial malleolar edge 64a. In order to obtain the views shown in FIGS. 14B-14D, the positions at which the images and/or data of the three-dimensional scan are provided is such that three planes 10, 12, 14 are set to intersect at a height on the coronal plane about 1 mm distal to a line drawn across the upper part of the talar cortical surface 80. It is understood that in situations where the talus is malpositioned (e.g., after ligamentous injury where it is tilted), the images and/or data may be provided such that the sagittal plane 14 is approximately parallel to the distal tibial articular surface. In order to determine the medial malleolar axis 60, a position on the anterior medial malleolar edge 64a is identified. The anterior medial malleolar edge 64a can be identified and correlated in each of the three images in the various planes (e.g., a three-images set in each of planes 10, 12, 14). By correlating the position of the anterior medial malleolar edge 64a in the three images, a three-dimensional position is obtained for the anterior medial malleolar edge 64a of the medial malleolus.

Referring to FIGS. 15A-15D, a distal end of the tibia 50 is shown, wherein the figures generally relate to the dorsal medial malleolar edge 64b. The position of the various planes 10, 12, 14 in FIG. 15A' represent the positions corresponding to the axial slices of FIGS. 15B-15D (e.g., a three-image set with an image in each plane). As indicated by the position of the axial slices shown in FIG. 15A', FIGS. 15A-15D illustrated the position of the dorsal medial malleolar edge 64b. In order to obtain the views shown in FIGS. 15B-15D, the positions at which the images and/or data of the three-dimensional scan are provided may be similar to the what is provided relating to FIGS. 14A-14D. In order to determine the medial malleolar axis 60, the position on the dorsal medial malleolar edge 64b is identified. The dorsal medial malleolar edge 64b can be identified and correlated in each of the three images in the various planes (e.g., a three-images set in each of planes 10, 12, 14). By correlating the position of the dorsal medial malleolar edge 64b in the three images, a three-dimensional position is obtained for the dorsal medial malleolar edge 64b of the medial malleolus.

Once the anterior medial malleolar edge 64a and the dorsal medial malleolar edge 64b are identified, the medial malleolar axis 60 is defined between the two positions associated with the anterior medial malleolar edge 64a and the dorsal medial malleolar edge 64b. As previously discussed with respect to other axes, the medial malleolar axis 60 can be identified in a three-dimensional coordinate system.

The method for determining the lateral malleolar axis 62 may be similar to that of determining the medial malleolar axis 60. For example, referring to FIGS. 16A-16D, a distal end of the tibia 50 is shown, wherein the figures generally relate to an anterior lateral malleolar edge 66a. The position of the various planes 10, 12, 14 in FIG. 16A represent the positions corresponding to the axial slices of FIGS. 16B-16D (e.g., a three-image set with an image in each plane). As indicated by the position of the axial slices shown in FIG. 16A, FIGS. 16-16D illustrated the position of the anterior lateral malleolar edge 66a. In order to obtain the views shown in FIGS. 16B-16D, the positions at which the images and/or data of the three-dimensional scan are provided may be similar to the what is provided relating to FIGS. 14A-14D. In order to determine the lateral malleolar axis 62, the position on the anterior lateral malleolar edge 66a is identified. The anterior lateral malleolar edge 66a can be identified and correlated in each of the three images in the various planes (e.g., a three-images set in each of planes 10, 12, 14). By correlating the position of the anterior lateral malleolar edge 66a in the three images, a three-dimensional position is obtained for the anterior lateral malleolar edge 66a of the lateral malleolus.

Referring to FIGS. 17A-17D, a distal end of the tibia 50 is shown, wherein the figures generally relate to a dorsal lateral malleolar edge 66b. The position of the various planes 10, 12, 14 in FIG. 17A' represent the positions corresponding to the axial slices of FIGS. 17B-17D (e.g., a three-image set with an image in each plane). As indicated by the position of the axial slices shown in FIG. 17A', FIGS. 17A-17D illustrated the position of the dorsal lateral malleolar edge 66b. In order to obtain the views shown in FIGS. 17B-17D, the positions at which the images and/or data of the three-dimensional scan are provided may be similar to what is provided relating to FIGS. 14A-14D. In order to determine the lateral malleolar axis 62, the position on the dorsal lateral malleolar edge 66b is identified. The dorsal lateral malleolar edge 66b can be identified and correlated in each of the three images in the various planes (e.g., a three-images set in each of planes 10, 12, 14). By correlating the position of the dorsal lateral malleolar edge 66*b* in the three images, a three-dimensional position is obtained for the dorsal lateral malleolar edge 66*b* of the lateral malleolus.

Once the anterior lateral malleolar edge 66*a* and the dorsal lateral malleolar edge 66*b* are identified, the lateral malleolar axis 62 is defined between the two positions associated with the anterior lateral malleolar edge 66*a* and the dorsal lateral malleolar edge 66*b*. As previously discussed with respect to other axes, the lateral malleolar axis 62 can be identified in a three-dimensional coordinate system.

Figure 18A:
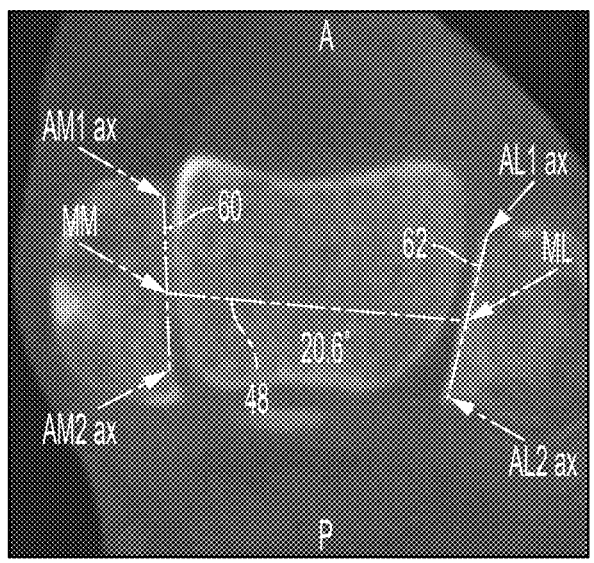
FIGS. 18A-18C are images and illustrations demonstration a transmalleolar axis, medial malleolar axis, and a lateral malleolar axis, in accordance with an embodiment.
Figure 18B:
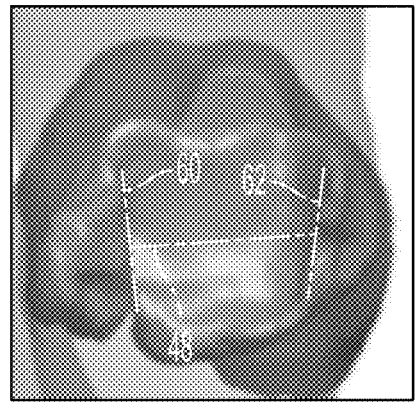
Figure 18C:
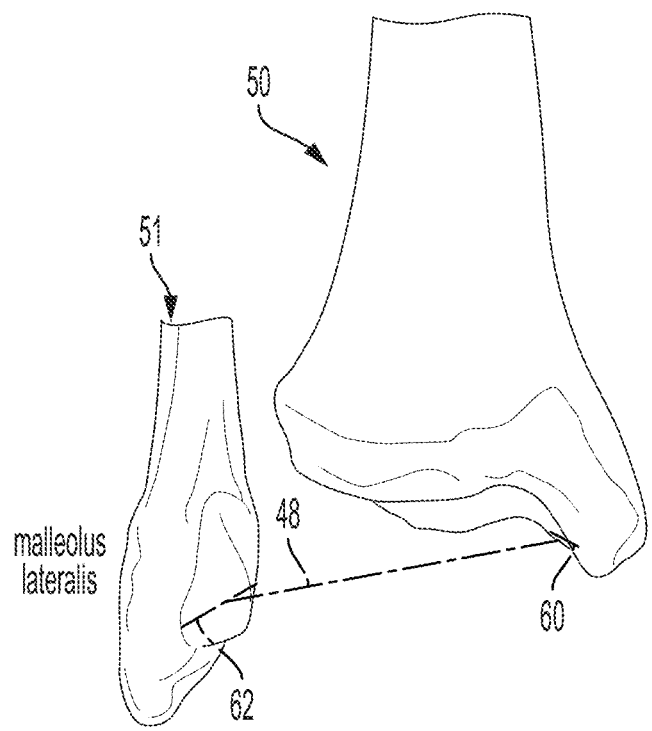

Referring now to FIGS. 18A-18C, once the medial and lateral malleolar axes 60, 62 are identified, the TMA 48 is defined. The TMA 48 is defined between the medial and lateral malleolar axes 60, 62, wherein the TMA 48 extends from a midpoint of each of the medial and lateral malleolar axes 60, 62. As previously discussed with respect to other axes, the TMA 48 can be identified in a three-dimensional coordinate system.

Figure 19:
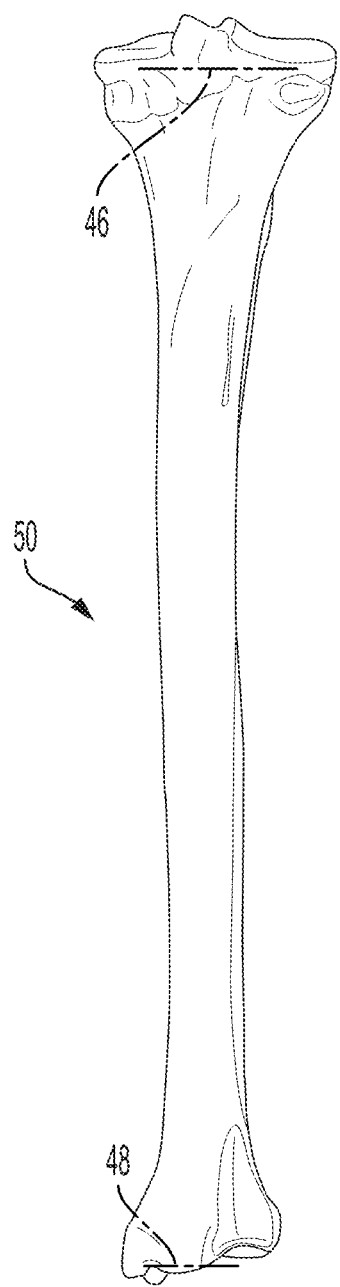
FIG. 19 is an illustration of a tibia including a proximal tibial axis and a transmalleolar axis, in accordance with an embodiment.

Referring to FIG. 19, the proximal tibial axis 46 can be seen relative to the TMA 48. Tibial torsion is determined by calculating the relative angle defined between the proximal tibial axis 46 and the TMA 48. If the torsion is facing externally to the sagittal plane, it is known as external tibial torsion. If it is facing internal to the sagittal plane it is known as internal tibial torsion.

Figure 21:
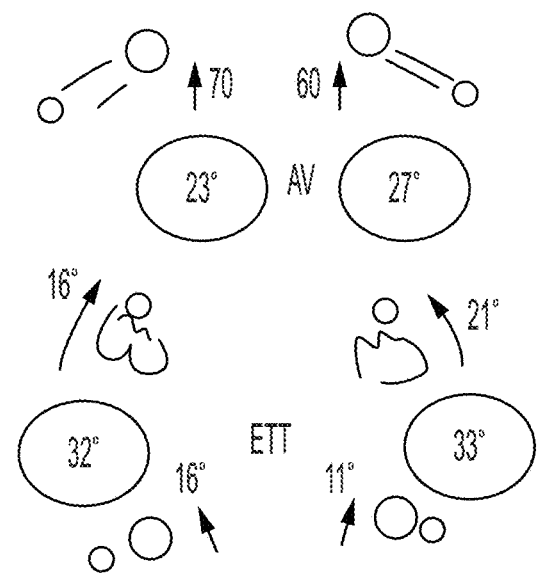
FIGS. 21 and 22 illustrate calculating and overlaying the various angles defined by a patient's anatomy, in accordance with an embodiment.
Figure 22:
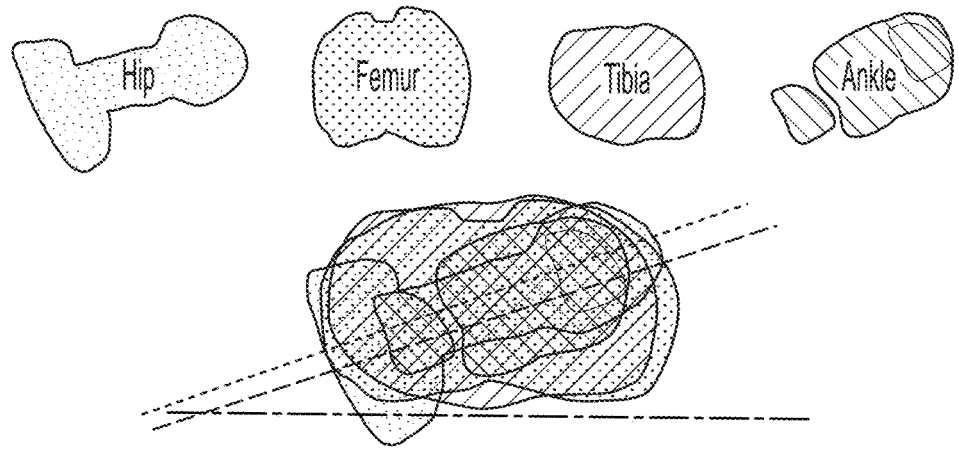
Figure 23:
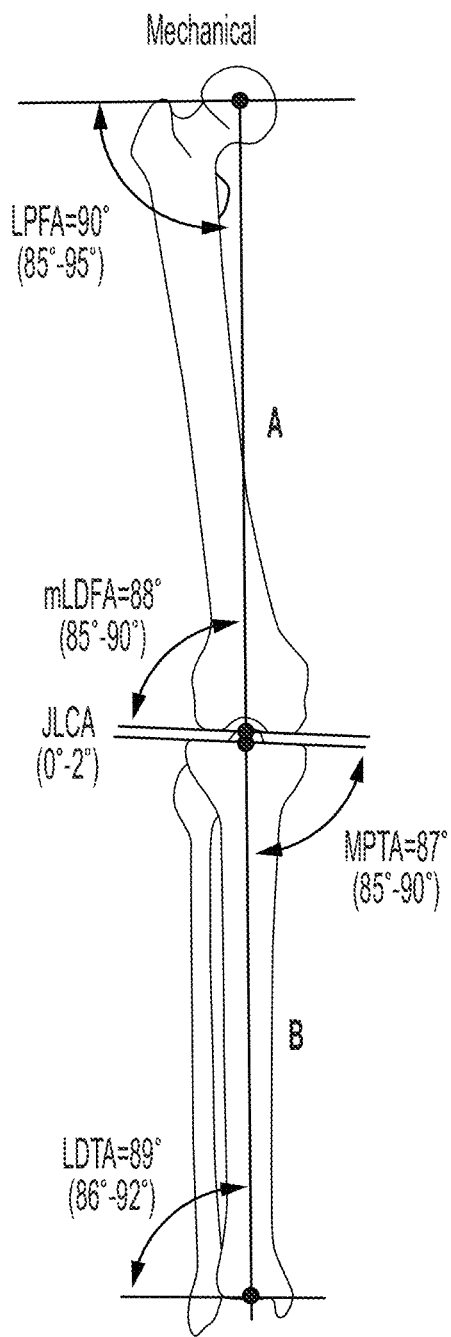
FIGS. 23-26 illustrate various illustrations of hip version and tibial torsion, in accordance with various embodiments.
Figure 24:
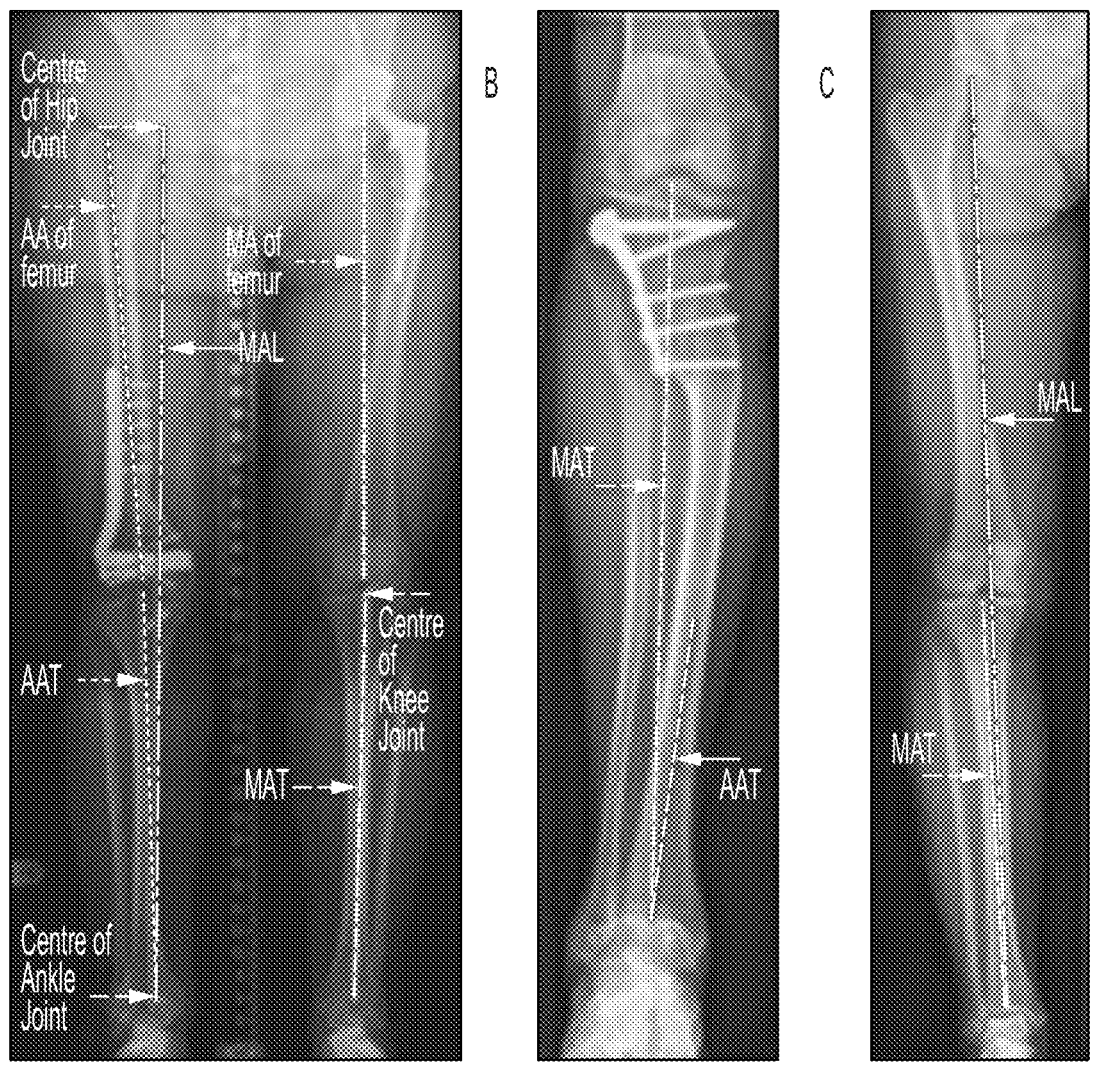
Figure 25:
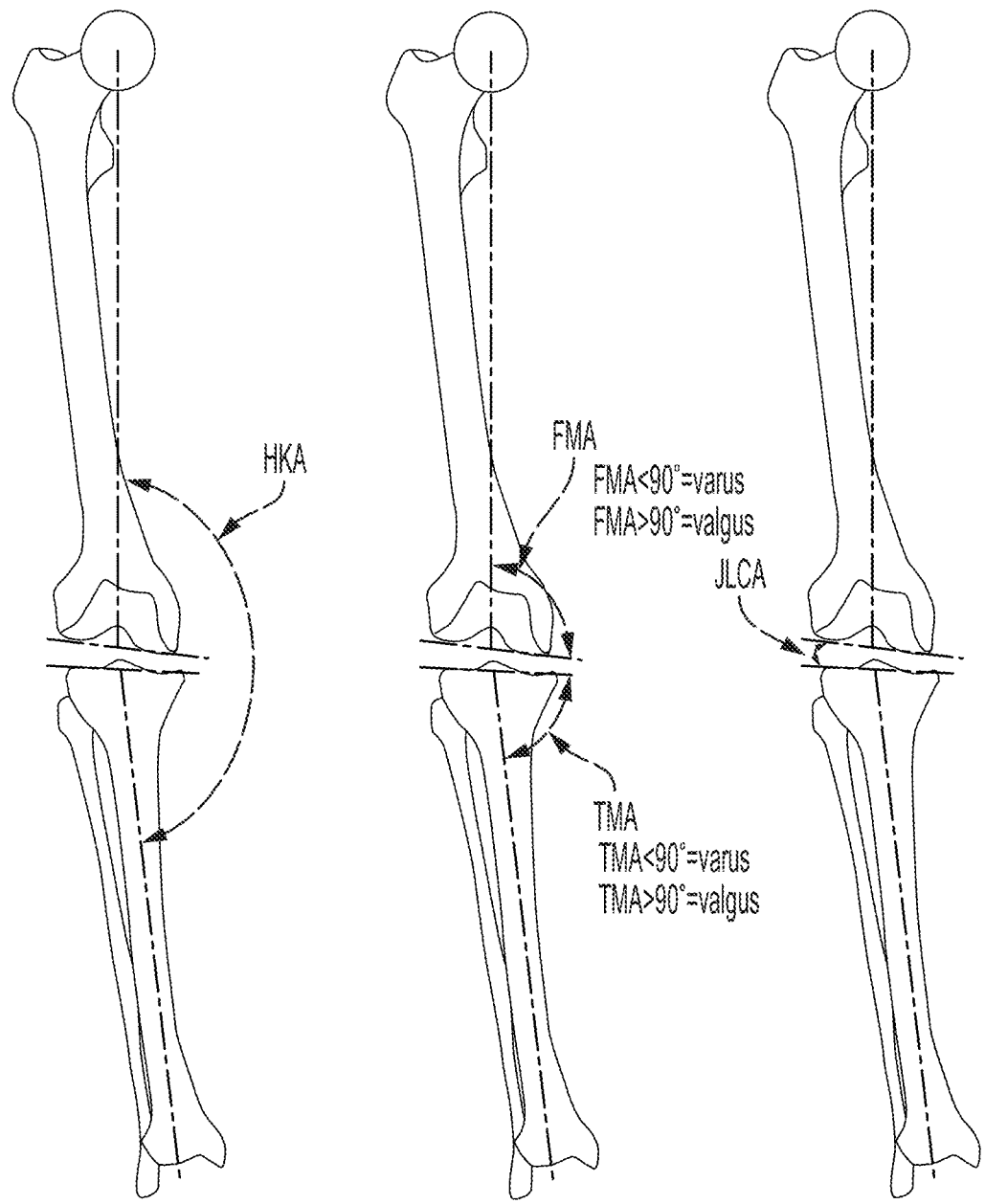
Figure 26:
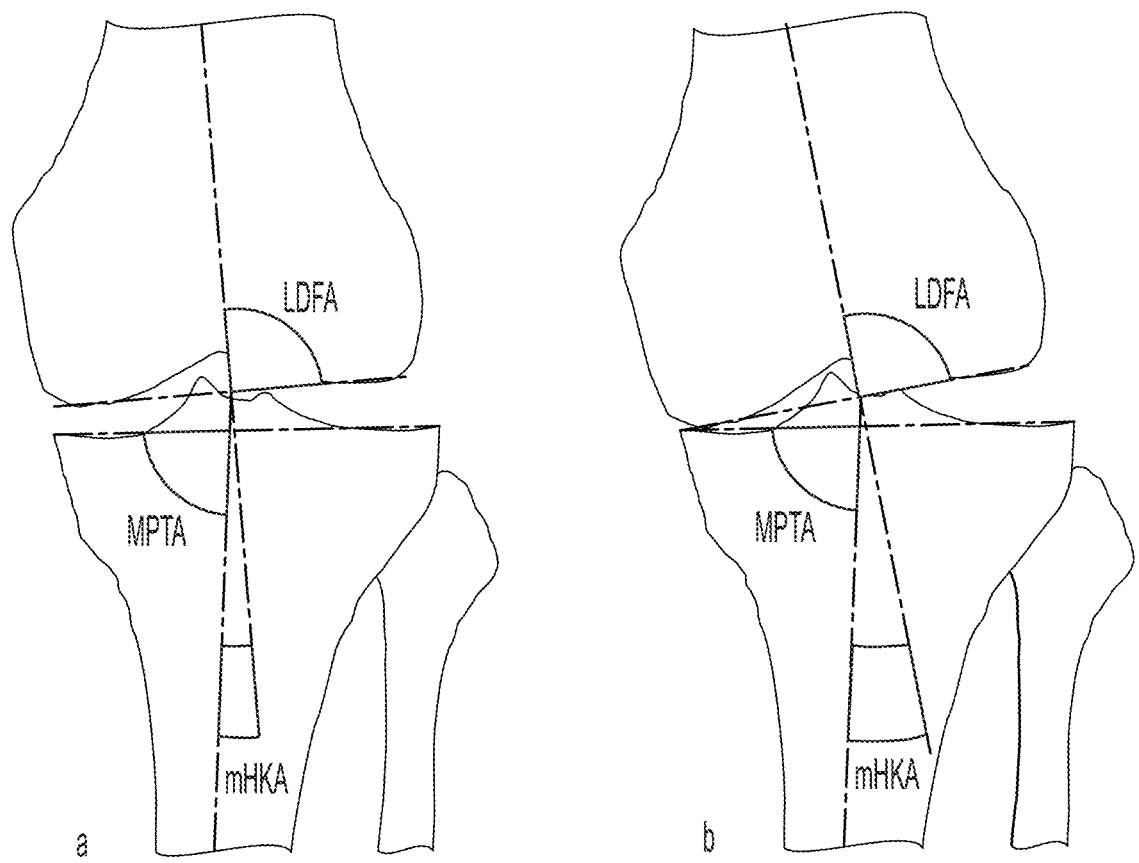

In some embodiments and with reference to FIGS. 21 and 22, measurements may be calculated to determine hip version and tibial torsion. In some embodiments, two-dimensional angle calculations may implement vector match (i.e., dot product or law of cosine) to produce the six individual angle values between the horizontal line and each of the 6 lines drawn. The two-dimensional angle calculation may implement measurements shown in the sagittal plane or may be simplified from the positions identified in the methods provided herein to only view the relative angles in a single plane. In other embodiments, the measurements of the angles can be measured in three dimensional space as discussed throughout and, using vector dot products or law of cosine, the hip version and tibial torsion can each individually be calculated and then a relationship between hip version and tibial torsion can be calculated.

It is understood that the methods described herein may be accomplished manually or may be provided via an automated system. The methods described herein provide for intra-operator and inter-operator reliability between calculations. In some embodiments, the methods described herein may be implemented in an automated system in which the positions described may be selected and identified by a processor. The processor may be trained using artificial intelligence and deep learning approaches to identify the positions described herein or other positions and anatomical features that generally provide the coordinates or reference points for determining hip version and tibial torsion.

These coordinates and/or reference points, whether determined manually or through an automated process, may be mapped within three-dimensional space. For example, the scan discussed herein may be used to provide and define a three-dimensional volume. The various axes (e.g., femoral neck axis, distal femoral axis, proximal tibial axis, and distal tibial axis) discussed herein may be provided within the three-dimensional volume. The various axes may be represented by a vector within the three-dimensional volume, wherein the vector may align and be coextensive with the axes (e.g., begin and terminate at the positions described herein), or the vectors may be provided as aligning with the axes and extending beyond the positions defining the axes.

Thus, in some embodiments, the vectors are used to map or represent the relevant axes in the three-dimensional volume as they relate to the datapoints used to determine hip version and tibial torsion. In some embodiments, the scan may be used to construct a three-dimensional model of the patient's lower limb(s). The three-dimensional model may be implemented (either alone, or in combination with the images or slices described herein) to select the various positions described herein rather than relying solely on the images or slices described herein.

It is understood that the relationship between each of the anatomical positions described herein may be represented or provided to the user in different formats. For example, when lines are implemented to represent the femoral neck angle (e.g., a first line), the distal femoral angle (e.g., a second line), the proximal tibial angle (e.g., a third line), and the distal tibial angle (e.g., a fourth line), the relationship between the lines may be provided to the user in various formats (e.g., percentage, angle, etc.). Furthermore, when the first and second lines are implemented to provide a value of hip version, the angle between the first and second lines may be provided as the angle in a single plane (e.g., the coronal plane), or may be provided as the actual angle between the two. For example, because the angle between a first line and a second line may have components in each of the X, Y, and Z axes, the angle between the lines may be different depending on how the relationship is viewed (e.g., depending on the relationship of the two being viewed in a single plane or a three-dimensional volume or depending on which plane is implemented if the relationship is provided in a single plane). In some embodiments, the angle between the first and second lines is provided as the relationship between the two in a single plane as that provides the level of hip version that is commonly used in medical practice.

Once both the hip version and tibial torsion of the patient are determined, the relative difference of a patient's hip version as compared to baseline hip version and a patient's tibial torsion as compared to baseline tibial torsion. The baseline hip version and tibial torsion may be based on averages of populations, may be provided based on subgroups of populations such as age, gender, height, and so forth, or may be provided based on factors including optimal anatomical and or biomechanical factors.

With further reference to FIGS. 21 and 22, a method for determining hip version and tibial torsion may include using the data obtained from the High-Rise™ Scanner (Curvebeam®, PA, USA), various axial slices through the hips, knees and ankles are examined. The data is displayed on a screen or viewer as convention with the right sided data on the left-hand side and the left sided data on the right as though viewed from a facing position. A reference line is drawn to the horizontal on all images as this then takes into account pelvic rotation, as all lines are referenced to the horizontal.

FIGS. 23-26 provide examples of hip version and tibial torsion. For reference to the drawing, various identifiers are provided, which are defined as follows:

Mechanical Axis of the Limb (MAL) —This is the center of the femoral head to the center of the tibial plafond. The amended MAL is measured from the center of the femoral head to the weight bearing point of the calcaneum (aMAL).

Hip Knee Angle (HKA) —A line is drawn from the center of the femoral head to the femoral intercondylar notch (Line A below). A second line is drawn from the tibial interspinous point to the central point on the distal tibial plafond (Line B below). The HKA is defined as the angle between these two lines.

Lateral Proximal Femoral Angle (LPFA) —First a line is drawn from the superior point of the greater trochanter to the center of the femoral head. Then a second line is drawn from the center of the femoral head to the femoral intercondylar notch (Line A below). The line joining the two is the LPFA and is usually 90 degrees.

Mechanical Lateral Distal Femoral Angle (mLDFA) —Also referred to as the femoral mechanical-anatomical (FMA) angle is the bisection of the line drawn from the center of the femoral head to the femoral intercondylar notch (Line A below) and a second line drawn across the most distal part of the medial and lateral femoral condyles.

Medial Proximal Tibial Angle (MPTA) —Also referred to as the tibial mechanical axis (TMA). First a line is drawn from drawn the tibial interspinous point to the central point on the distal tibial plafond (Line B). A second line is drawn from the medial to the lateral most proximal area of the tibial plateau (while excluding the osteophyte at the tibial plateau surface). The connection of these two lines is the MPTA.

Joint Line Convergence Angle (JLCA) —The JLCA is defined as the angle between the tangent to the most distal part of the medial and lateral femoral condyle and the subchondral plate of the tibial plateau. Two lines are measured. One connecting the distal femoral articular surfaces and a second connecting the proximal tibial articular surfaces. The line subtended between these lines is the JLCA.

Lateral Distal Tibial Angle (LDTA) —LDTA is measured by the angle created by a line of central axis of the tibia (line B) and a line drawn across the distal tibial articular surface.

Tibiotalar angle (TTA) —The tibiotalar angle is center point of the medial and lateral margins of the diaphysis of the tibia (using two spheres 5 cm and 15 cm above the ankle). A separate line is drawn along the top of the articular surface of the talus. The medial angle gives the tibiotalar angle.

The Mechanical Axis of the Limb to the Tibial Articular surface (MALTA) is the line subtended between the mechanical axis of the Limb (MAL) and the line drawn along the top of the articular surface of the talus (Bernasconi 2021).

Figure 28:
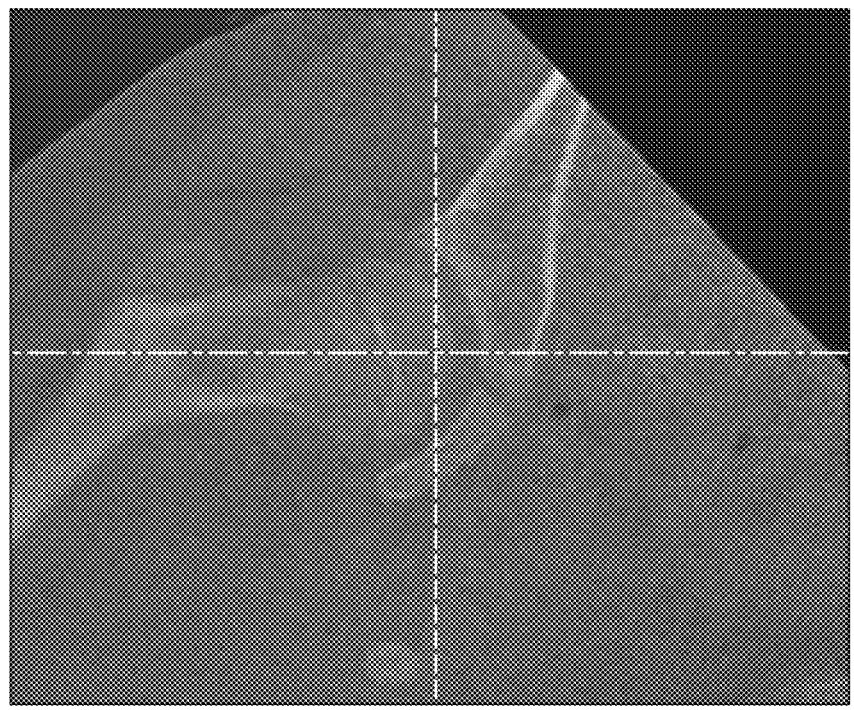
FIGS. 28 and 29 show images of a scan showing a femoral head and neck, in accordance with an embodiment.
Figure 29:
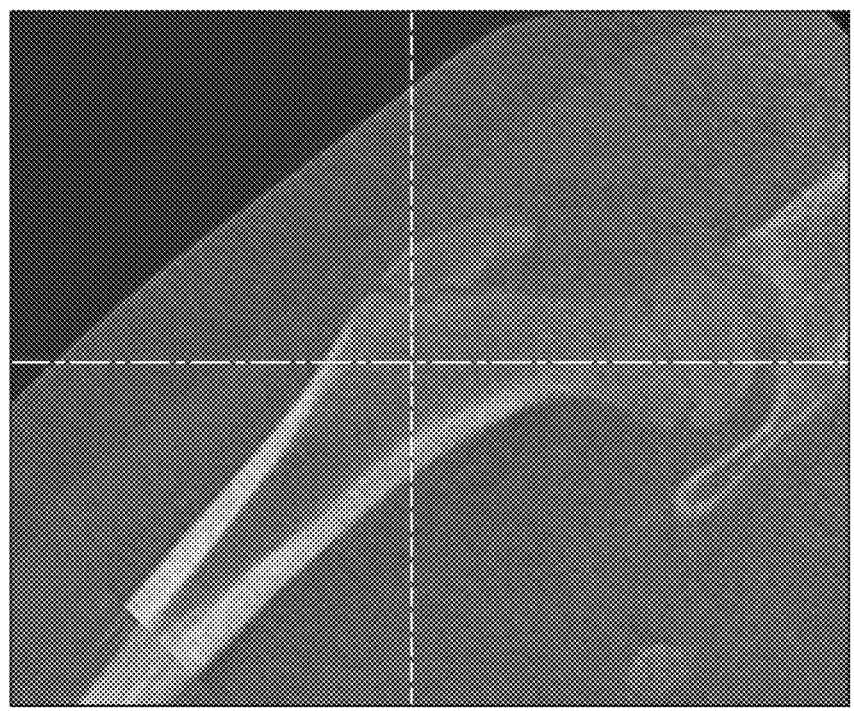

Referring to FIGS. 28 and 29, a transverse (axial) slice is selected that best illustrates both femoral heads and the position of the femoral neck (shaft). The user (or computer program) identifies the central shaft of the femur by moving up and down the leg. Then using the axial slice through the femoral head, a line is drawn from the center of the femoral shaft to the center of the femoral head. A second line is drawn along the horizontal axis. The angle subtended between these lines is the femoral neck rotation. When the femoral head is anterior (towards the front of the body) to the horizontal line the number is positive and indicates anteversion (which is anti-clockwise on the right hip and clockwise on the left hip). If the femoral heads are behind the horizontal then this number is negative and referred to as retroversion.

Figure 30:
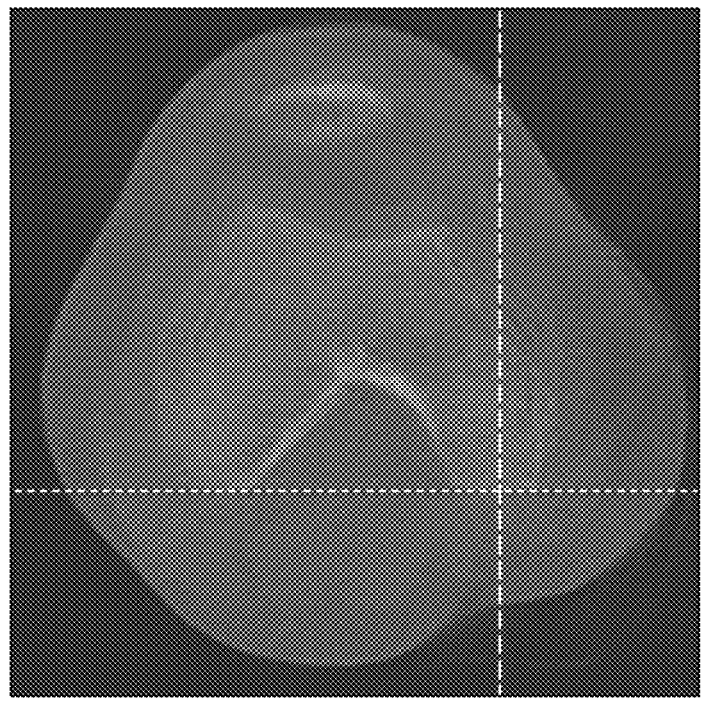
FIGS. 30 and 31 show images of a scan showing a distal portion of a femur, in accordance with an embodiment.
Figure 31:
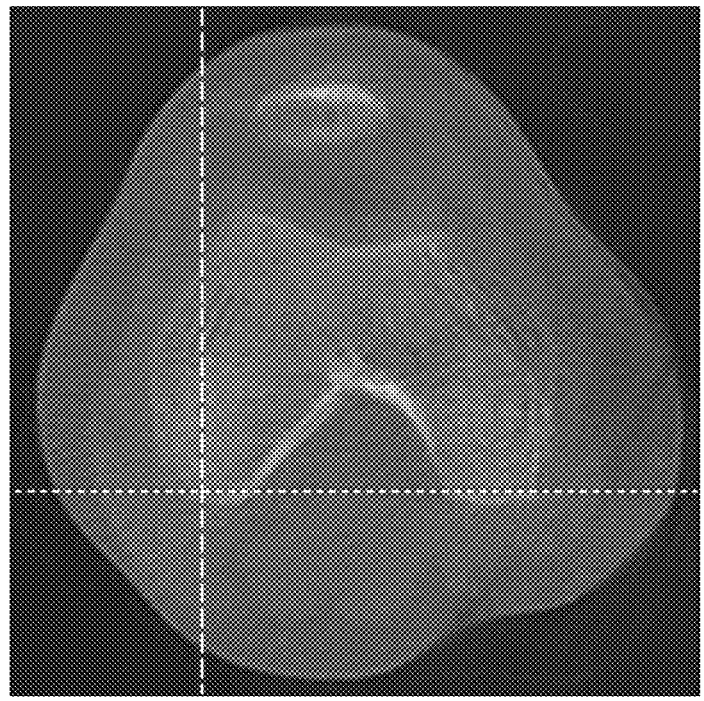

Referring to FIGS. 30 and 31, the next axial scan to be examined is at the knee in the center of the femoral condyles. A line is drawn along the posterior condyles of the femur and a second line is drawn along the horizontal axis. The angle subtended between these lines is the rotation of the distal femur. When the kneecap is facing inwards (clockwise on the right knee) then the femur is internally rotated. This angle is positive. Similarly, on a left knee the patella should be facing forwards but if facing inwards (counterclockwise) then the distal femur is internally rotated, and this number is positive. If the kneecap (patella) is facing outwards, then the number is reversed and is negative.

To calculate hip version, the femoral neck angle and the distal femur angle are added together. In the example illustrated in FIG. 21, the right side (shown on the left hand of the page) the angles are 7 degrees and 16 degrees giving a right sided femoral anteversion of 23 degrees. On the left side it is 21 degrees of internal rotation of the distal femur and 6 degrees of anterior rotation of the femoral neck, giving an overall femoral version angle of 27 degrees of anteversion.

Figure 32:
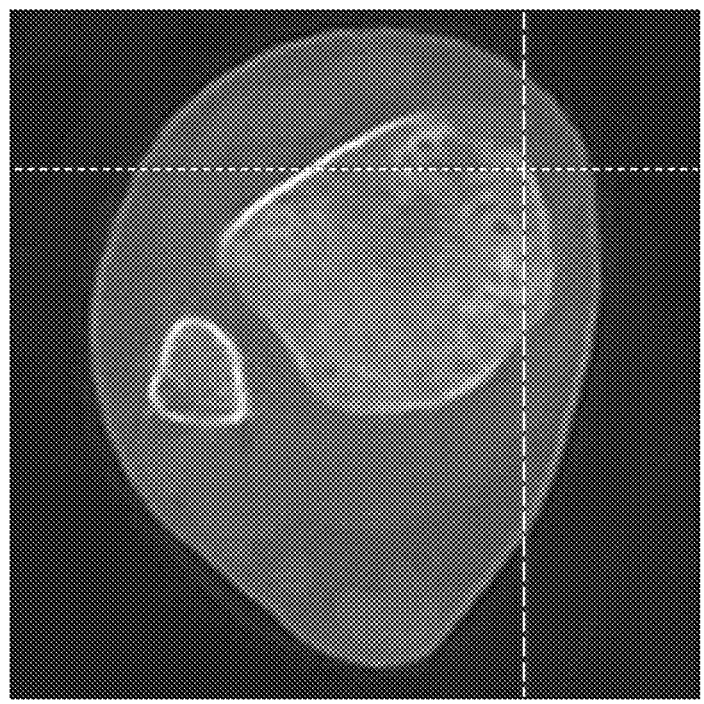
FIGS. 32 and 33 show images of a scan showing a proximal portion of a tibia, in accordance with an embodiment.
Figure 33:
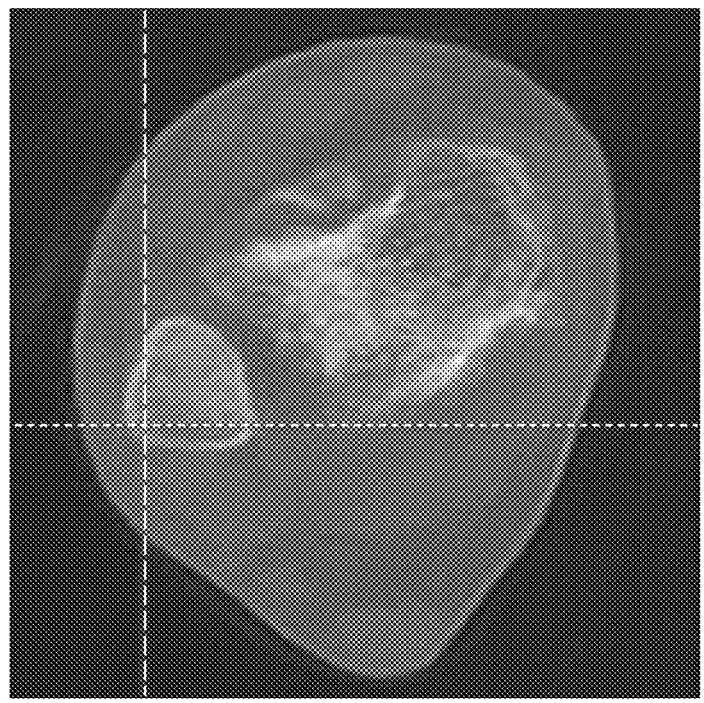

Referring to FIGS. 32 and 33, next the axial slice is moved down to the proximal tibia and a line is drawn across the back of the tibial condyle and a second line is drawn to the horizontal (which approximates to the same rotation as the femur). The angle subtended by these two lines is the rotation of the proximal tibia.

Figure 34:
FIGS. 34-36 show images of a scan showing a distal portion of a tibia, in accordance with an embodiment.
Figure 35:
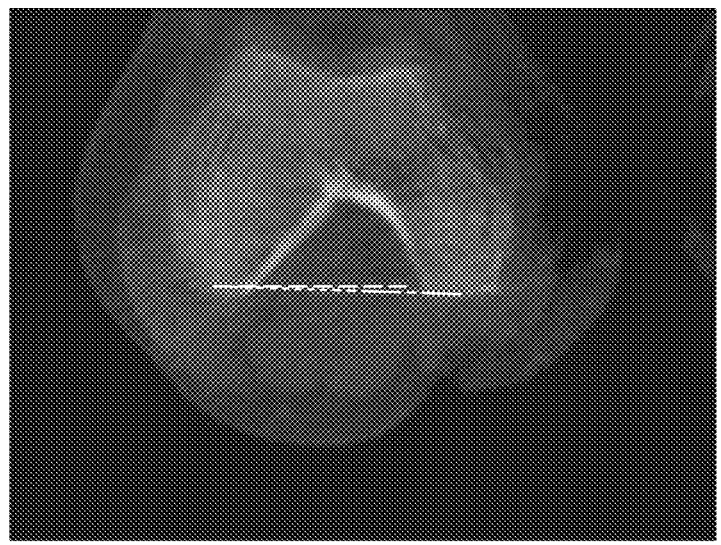

Referring to FIGS. 34 and 35, the axial slice is now brought down to the ankle approximately 2 mm above the ankle joint and a line is drawn that bisects the medial and lateral malleoli. This is recorded as the transmalleolar axis. A second line is drawn to the horizontal and the angle subtended between them is the transmalleolar axis. In the same vein as above, external rotation is expressed as a positive angle and internal to midline is expressed as a negative angle (on the right positive is counterclockwise whereas on the left it is clockwise).

Figure 36:
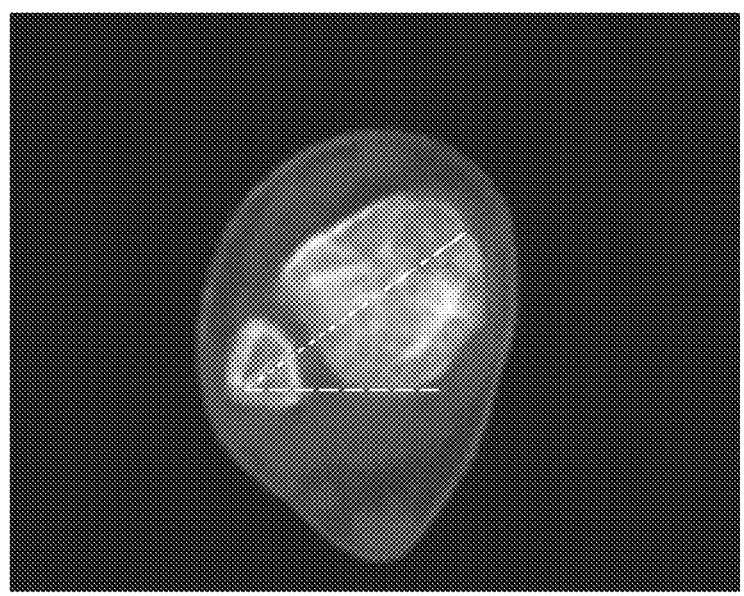

Referring to FIG. 36, to calculate tibial version (or the twist of the tibia), the proximal tibial measurement is added to the transmalleolar measurement. So, in the above example 16 degrees of internal rotation of the knee is added to 16 degrees of external rotation of the ankle giving a tibial torsion of 32 degrees of the right tibia. On the left tibia the proximal tibia is 32 degrees internally rotated, and the ankle 11 degrees externally rotated giving a tibial version of 33 degrees.

The system will also provide clinicians with an illustrative summary of the lower limb alignment by presenting all of the axial measurements superimposed on one another as shown in FIG. 22 so that the user can see the foot relationship to the hip.

Referring again to FIG. 6, the system will also capture leg length (broken into height of most lateral lip of the acetabulum to floor, center femoral head to the floor, including the absolute length of the femur and absolute length of the tibia). In some embodiments, angulation of the bones in relation to each other may be present as well as rotation in the transverse (axial) plane. In such cases, although there may not be bone loss there may be a valgus or a varus knee or a flat foot on one side creating the appearance of a leg length difference. A leg length difference could lead to pelvic obliquity, and this will be measured by measuring the most superior part of both iliac crests and the floor. This is illustrated in at least FIGS. 24-26.

Figure 27:
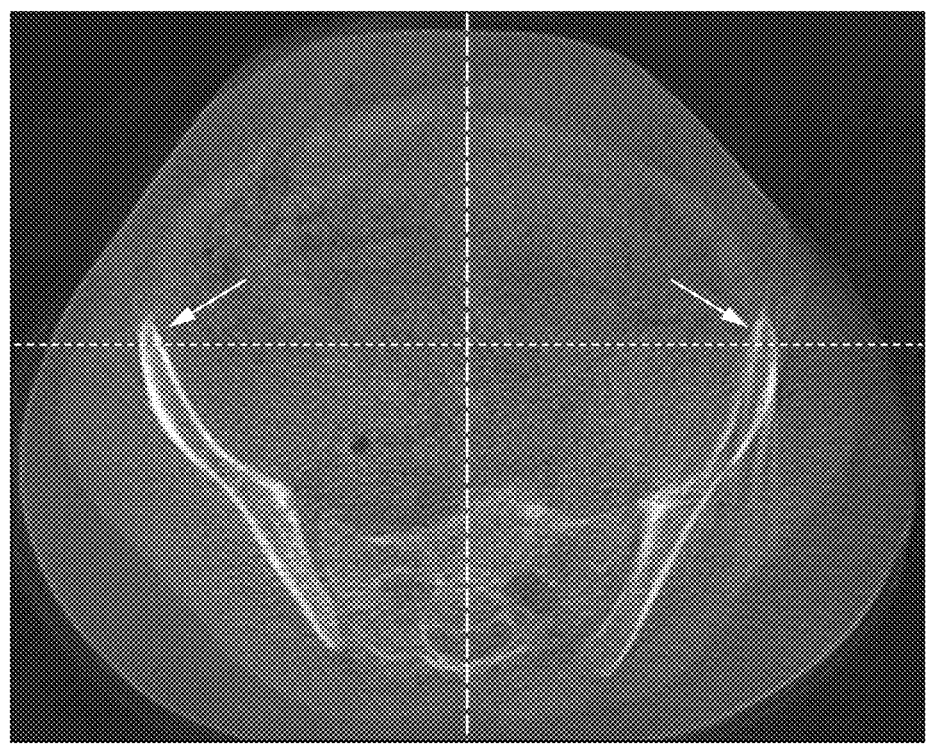
FIG. 27 is an image of a scan showing alignment of a scan, in accordance with an embodiment.

In some embodiments, the processor may generate the limb alignment measurements either semi-automatically or automatically as described below. For example, in semi-automatic embodiments, the method may include loading a dataset(s) into memory. Dataset(s) can either be a single volume containing voxels from the pelvis to the foot/feet, or can be comprised of individual volumes containing the pelvis, knees, feet individually, sorted in patient height direction. In some embodiments, the dataset may contain only one leg or, preferably, both legs, i.e., a bilateral scan. Referring to FIG. 27, the dataset may be calibrated to ensure that it is correctly oriented, that is, it is displaying axial slices with no rotation (due to patient positioning). For example, one landmark to assess correct rotation would be the pelvic bone structure.

The method includes marking twelve positions within the three-dimensional dataset, six for each patient side. For example, two positions are marked in the hip (the positions identified in the crosshairs as seen in FIGS. 28 and 29), two positions are marked in the knee (the positions identified in the crosshairs as seen in FIGS. 30 and 31), and two positions are marked in the lower tibia (the positions identified in the crosshairs as seen in FIGS. 32 and 33).

The method further includes calculating the hip angle between a line connecting the point marked in FIGS. 28 and 29 and a horizontal base line. This is illustrated in FIG. 34.

The method further includes calculating the knee angle between a line connecting the point marked in FIGS. 30 and 31 and a horizontal base line. This is illustrated in FIG. 35.

The method further includes calculating the lower tibia angle between a line connecting the point marked in FIGS. 32 and 33 and a horizontal base line. This is illustrated in FIG. 36.

The method further includes displaying and comparing hip/knee/lower tibia angles.

In a fully automated method, many step are similar to those described with respect to FIGS. 27-36, wherein all twelve positions discussed are identified from an AI-based algorithm with no user interaction requirement except loading the dataset to a location in which it can be processed by processor via an algorithm. The output will be formatted into quantitative results and visual graphics displayed in an interactive user interface.

EXAMPLES

Example 1

A method of determining axial alignment of a lower limb is provided. The method includes determining a three-dimensional volume based on a scan of a lower limb of a patient; identifying a level of hip version by referring to a first axis of symmetry of a femoral neck and a second axis of symmetry of a distal portion of the femur, wherein hip version is defined by an angle between the first axis of symmetry and the second axis of symmetry; identifying a level of tibial torsion by referring to a third axis of symmetry of a proximal portion of the tibia and a fourth axis of symmetry of a distal portion of the tibia, wherein tibial torsion is defined by an angle between the third axis of symmetry and the fourth axis of symmetry; and providing the level of hip version and the level of tibial torsion to a user.

The method includes identifying the axis of symmetry by referring to the two-dimensional or three-dimensional shape of the bone (either as shown in images of the scan or in a three-dimensional model of the scan).

The method includes identifying the axis of symmetry by referring to reference points on the bone (either identified in images of the scan or in a three-dimensional model of the scan).

The method includes providing a first line generally representative of an axis of the femoral neck, the first line generally corresponding with the first axis of symmetry, and a second line generally representative of an axis of rotation of the distal portion of the fibula, the second line generally corresponding to the second axis of symmetry. The method, optionally, further includes, providing a third line generally representative of an axis of rotation of the proximal portion of the tibia, the third line generally corresponding to the third axis of symmetry, and a fourth line generally representative of an axis of rotation of the distal portion of the tibia, the fourth line generally corresponding to the fourth axis of symmetry.

The method includes calculating the angle between the first line and the second line, and calculating the angle between the third line and the fourth line.

Example 2

A method of determining axial alignment of a lower limb includes determining a three-dimensional volume based on a scan of a lower limb of a patient; identifying a level of hip version by referring to a first plurality of reference points within the three-dimensional volume relating to a femoral neck and a second plurality of reference points within the three-dimensional volume relating to a distal portion of the femur, wherein hip version is defined by a relationship between the first plurality of reference points and the second plurality of reference points; identifying a level of tibial torsion by referring to a third plurality of reference points within the three-dimensional volume relating to a proximal portion of the tibia and a fourth plurality of reference points within the three-dimensional volume relating to a distal portion of the tibia, wherein tibial torsion is defined by a relationship between the third plurality of reference points and the fourth plurality of reference points; and providing the level of hip version and the level of tibial torsion to a user.

The method includes providing a first line generally representative of an axis of the femoral neck, the first line generally corresponding with the first plurality of reference points, and a second line generally representative of an axis of rotation of the distal portion of the fibula, the second line generally corresponding to the second plurality of reference points, and includes providing a third line generally representative of an axis of rotation of the proximal portion of the tibia, the third line generally corresponding to the third plurality of reference points, and a fourth line generally representative of an axis of rotation of the distal portion of the tibia, the fourth line generally corresponding to the fourth plurality of reference points.

The method includes calculating the angle between the first line and the second line, and calculating the angle between the third line and the fourth line.

The method includes determining a femoral neck angle based on a position of a center of a femoral head relative to a center of a base of a femoral neck, wherein the first line is defined extending between the center of the femoral head and a center of a base of a femoral neck.

The method includes identifying the positions of the center of the femoral head and the center of the base of the femoral neck in three-dimensional space by identifying the center of the femoral head on at least two images, each of the at least two images being in different planes, and by identifying the base of the femoral neck on at least two images, each of the at least two images being in different planes.

The method includes determining a distal femoral angle relating to an axis of rotation of a distal end of a femur, wherein the second line relates to the distal femoral angle.

The method includes that the distal femoral angle is based on a position of a posterior position of a medial femoral condyle or epicondyle to a posterior position of a lateral femoral condyle or epicondyle, respectively, wherein the posterior position of the medial femoral condyle or epicondyle and posterior position of the lateral femoral condyle or epicondyle are identified in three-dimensional space by identifying the posterior position of the medial femoral condyle or epicondyle on at least two images, each of the at least two images being in different planes, and identifying the posterior position of the lateral femoral condyle or epicondyle on at least two images, each of the at least two images being in different planes.

The method includes determining a proximal tibial angle relating to an axis of rotation of a proximal end of a tibia, wherein the third line relates to the proximal tibial angle.

The method includes that the proximal tibial angle is based on a position of an anterior position of a medial tibial condyle to an anterior position of a lateral tibial condyle, wherein the anterior position of the medial tibial condyle and anterior position of the lateral tibial condyle are identified in three-dimensional space by identifying the anterior position of the medial tibial condyle on at least two images, each of the at least two images being in different planes, and identifying the anterior position of the lateral tibial condyle on at least two images, each of the at least two images being in different planes.

The method includes determining a distal tibial angle relating to a line connecting a center of a first tangential line extending between outermost lateral surfaces of a medial malleolus and a second tangential line extending between innermost medial surfaces of a lateral malleolus, wherein the fourth line relates to the line between the first tangential line and the second tangential line.

The method includes identifying a posterior position on the outermost lateral surfaces of the medial malleolus in three images of the received images, an anterior position on the outermost lateral surfaces of the medial malleolus in at least two images of the received images. each of the at least two images being in different planes, a posterior position on the innermost medial surfaces of the lateral malleolus in at least two images of the received images, each of the at least two images being in different planes, an anterior position on the innermost lateral surfaces of the medial malleolus in three images of the received images.

The method includes that the relationship between the first line and the second line is compared in a single plane.

The method includes that the scan is a single scan of an entirety of the lower limb.

The method includes that the scan is taken when the patient is weight bearing.

The method includes providing a relationship of the patient's level of hip version and tibial torsion to a predetermined level of hip version and tibial torsion.

The method includes displaying to a user alignment of the lower limb, wherein the alignment is displayed by overlaying the first line with the second line, the third line, and the fourth line.

Example 3

A method of determining axial alignment of a lower limb includes determining a three-dimensional volume based on a scan of a lower limb of a patient; identifying a level of hip version by referring to a first plurality of reference points within the three-dimensional volume relating to a femoral neck and a second plurality of reference points within the three-dimensional volume relating to a distal portion of the femur, wherein hip version is defined by a relationship between the first plurality of reference points and the second plurality of reference points; identifying a level of tibial torsion by referring to a third plurality of reference points within the three-dimensional volume relating to a proximal portion of the tibia and a fourth plurality of reference points within the three-dimensional volume relating to a distal portion of the tibia, wherein tibial torsion is defined by a relationship between the third plurality of reference points and the fourth plurality of reference points; and providing the level of hip version and the level of tibial torsion to a user.

The method includes providing a first line generally representative of an axis of the femoral neck, the first line generally corresponding with the first plurality of reference points, and a second line generally representative of an axis of rotation of the distal portion of the fibula, the second line generally corresponding to the second plurality of reference points, and includes providing a third line generally representative of an axis of rotation of the proximal portion of the tibia, the third line generally corresponding to the third plurality of reference points, and a fourth line generally representative of an axis of rotation of the distal portion of the tibia, the fourth line generally corresponding to the fourth plurality of reference points.

The method includes calculating the angle between the first line and the second line, and calculating the angle between the third line and the fourth line.

The method includes determining a femoral neck angle based on a position of a center of a femoral head relative to a center of a base of a femoral neck, wherein the first line is defined extending between the center of the femoral head and a center of a base of a femoral neck.

The method includes that the positions of the center of the femoral head and the center of the base of the femoral neck are identified in three-dimensional space by identifying the center of the femoral head on a first image in a frontal plane, a second image in a sagittal plane, and a third image in a transverse plane and identifying the center of the base of the femoral neck on a fourth image in a frontal plane, a fifth image in a sagittal plane, and a sixth image in a transverse plane.

The method includes determining a distal femoral angle relating to an axis of rotation of a distal end of a femur, wherein the second line relates to the distal femoral angle.

The method includes that the distal femoral angle is based on a position of a posterior position of a medial femoral condyle or epicondyle to a posterior position of a lateral femoral condyle or epicondyle, respectively, wherein the posterior position of the medial femoral condyle or epicondyle and posterior position of the lateral femoral condyle or epicondyle are identified in three-dimensional space by identifying the posterior position of the medial femoral condyle or epicondyle on a seventh image in a frontal plane, an eighth image in a sagittal plane, and a ninth image in a transverse plane and identifying the posterior position of the lateral femoral condyle or epicondyle on a tenth image in a frontal plane, a eleventh image in a sagittal plane, and a twelfth image in a transverse plane.

The method includes determining a proximal tibial angle relating to an axis of rotation of a proximal end of a tibia, wherein the third line relates to the proximal tibial angle.

The method includes that the proximal tibial angle is based on a position of an anterior position of a medial tibial condyle to an anterior position of a lateral tibial condyle, wherein the anterior position of the medial tibial condyle and anterior position of the lateral tibial condyle are identified in three-dimensional space by identifying the anterior position of the medial tibial condyle on a thirteenth image in a frontal plane, a fourteenth image in a sagittal plane, and a fifteenth image in a transverse plane and identifying the anterior position of the lateral tibial condyle on a sixteenth image in a frontal plane, a seventeenth image in a sagittal plane, and an eighteenth image in a transverse plane.

The method includes determining a distal tibial angle relating to a line connecting a center of a first tangential line extending between outermost lateral surfaces of a medial malleolus and a second tangential line extending between innermost medial surfaces of a lateral malleolus, wherein the fourth line relates to the line between the first tangential line and the second tangential line.

The method includes identifying a posterior position on the outermost lateral surfaces of the medial malleolus in three images of the received images, an anterior position on the outermost lateral surfaces of the medial malleolus in at least two images of the received images. each of the at least two images being in different planes, a posterior position on the innermost medial surfaces of the lateral malleolus in at least two images of the received images, each of the at least two images being in different planes, an anterior position on the innermost lateral surfaces of the medial malleolus in three images of the received images.

The method includes that the relationship between the first line and the second line is compared in a single plane.

The method includes that the scan is a single scan of an entirety of the lower limb.

The method includes that the scan is taken when the patient is weight bearing.

The method includes providing a relationship of the patient's level of hip version and tibial torsion to a predetermined level of hip version and tibial torsion.

The method includes displaying to a user alignment of the lower limb, wherein the alignment is displayed by overlaying the first line with the second line, the third line, and the fourth line.

Example 4

A method of determining axial alignment of a lower limb includes determining a three-dimensional volume based on a scan of a lower limb of a patient; identifying a level of hip version by referring to a first plurality of reference points within the three-dimensional volume relating to a femoral neck and a second plurality of reference points within the three-dimensional volume relating to a distal portion of the femur, wherein hip version is defined by a relationship between the first plurality of reference points and the second plurality of reference points; identifying a level of tibial torsion by referring to a third plurality of reference points within the three-dimensional volume relating to a proximal portion of the tibia and a fourth plurality of reference points within the three-dimensional volume relating to a distal portion of the tibia, wherein tibial torsion is defined by a relationship between the third plurality of reference points and the fourth plurality of reference points; and providing the level of hip version and the level of tibial torsion to a user.

The method includes providing a first line generally representative of an axis of the femoral neck, the first line generally corresponding with the first plurality of reference points, and a second line generally representative of an axis of rotation of the distal portion of the fibula, the second line generally corresponding to the second plurality of reference points, and includes providing a third line generally representative of an axis of rotation of the proximal portion of the tibia, the third line generally corresponding to the third plurality of reference points, and a fourth line generally representative of an axis of rotation of the distal portion of the tibia, the fourth line generally corresponding to the fourth plurality of reference points.

The method includes calculating the angle between the first line and the second line, and calculating the angle between the third line and the fourth line.

The method includes determining a femoral neck angle based on a position of a center of a femoral head relative to a center of a base of a femoral neck, wherein the first line is defined extending between the center of the femoral head and a center of a base of a femoral neck.

The method includes that the positions of the center of the femoral head and the center of the base of the femoral neck are identified in three-dimensional space by identifying the center of the femoral head and the center of the base of the femoral neck within a three dimensional model based on the scan of the lower limb of the patient.

The method includes determining a distal femoral angle relating to an axis of rotation of a distal end of a femur, wherein the second line relates to the distal femoral angle.

The method includes that the distal femoral angle is based on a position of a posterior position of a medial femoral condyle or epicondyle to a posterior position of a lateral femoral condyle or epicondyle, respectively, wherein the positions of the posterior position of the medial femoral condyle or epicondyle and posterior position of the lateral femoral condyle or epicondyle are identified in three-dimensional space by identifying the posterior position of the medial femoral condyle or epicondyle and posterior position of the lateral femoral condyle or epicondyle within a three dimensional model based on the scan of the lower limb of the patient.

The method includes determining a proximal tibial angle relating to an axis of rotation of a proximal end of a tibia, wherein the third line relates to the proximal tibial angle.

The method includes that the proximal tibial angle is based on a position of an anterior position of a medial tibial condyle to an anterior position of a lateral tibial condyle, wherein the positions of the anterior position of the medial tibial condyle and anterior position of the lateral tibial condyle are identified in three-dimensional space by identifying the anterior position of the medial tibial condyle and anterior position of the lateral tibial condyle within a three dimensional model based on the scan of the lower limb of the patient.

The method includes determining a distal tibial angle relating to a line connecting a center of a first tangential line extending between outermost lateral surfaces of a medial malleolus and a second tangential line extending between innermost medial surfaces of a lateral malleolus, wherein the fourth line relates to the line between the first tangential line and the second tangential line.

The method includes identifying a posterior position on the outermost lateral surfaces of the medial malleolus and an anterior position on the outermost lateral surfaces of the medial malleolus in three-dimensional space by identifying the posterior position on the outermost lateral surfaces of the medial malleolus and the anterior position on the outermost lateral surfaces of the medial malleolus within a three dimensional model based on the scan of the lower limb of the patient.

The method includes that the relationship between the first line and the second line is compared in a single plane.

The method includes that the scan is a single scan of an entirety of the lower limb.

The method includes that the scan is taken when the patient is weight bearing.

The method includes providing a relationship of the patient's level of hip version and tibial torsion to a predetermined level of hip version and tibial torsion.

The method includes displaying to a user alignment of the lower limb, wherein the alignment is displayed by overlaying the first line with the second line, the third line, and the fourth line.

Example 5

A method of determining axial alignment of a lower limb, includes positioning a patient; scanning a lower limb of a patient to produce images including sections in a frontal plane, sections in a sagittal plane, and sections in a transverse plane; obtaining a level of hip version based on the images; and obtaining a level of tibial torsion based on the images, wherein the level of hip version and the level of tibial torsion is mapped in three-dimensional space.

The method includes aligning the images by viewing an image in the transverse plane through a pelvis of the patient at a height of an anterior iliac spine of the iliac crest, wherein aligning includes rotating the image in the transverse plane for symmetry.

The method includes determining a femoral neck angle based on a position of a center of a femoral head relative to a center of a base of a femoral neck, wherein the positions of the center of the femoral head and the center of the base of the femoral neck are identified in three-dimensional space in a first, three image set and a second, three image set, respectively, wherein each of the first and second, three image set includes an image in the frontal plane, the sagittal plane, and the transverse plane.

The method includes determining a distal femoral angle based on a position of a posterior position of a medial femoral condyle or epicondyle to a posterior position of a lateral femoral condyle or epicondyle, respectively, wherein the posterior position of the medial femoral condyle or epicondyle and posterior position of the lateral femoral condyle or epicondyle are identified in three-dimensional space in a third, three image set and a fourth, three image set, respectively, wherein each of the third and fourth, three image set includes an image in the frontal plane, the sagittal plane, and the transverse plane.

The method includes determining a proximal tibial angle relating to an axis of rotation of a proximal end of a tibia, wherein the proximal tibial angle is based on a position of an anterior position of a medial tibial condyle to an anterior position of a lateral tibial condyle, wherein the anterior position of the medial tibial condyle and anterior position of the lateral tibial condyle are identified in three-dimensional space in a fifth, three image set and a sixth, three image set, respectively, wherein each of the first and second, three image set includes an image in the frontal plane, the sagittal plane, and the transverse plane.

The method includes determining a distal tibial angle relating to a line connecting a center of a first tangential line extending between outermost lateral surfaces of a medial malleolus and a second tangential line extending between innermost medial surfaces of a lateral malleolus.

The method includes identifying a posterior position on the outermost lateral surfaces of the medial malleolus, an anterior position on the outermost lateral surfaces of the medial malleolus, a posterior position on the innermost medial surfaces of the lateral malleolus, and an anterior position on the innermost lateral surfaces of the medial malleolus in three-dimensional space in a seventh, three image set, an eighth, three image set, a ninth, three image set, and a tenth, three image set, respectively, wherein each of the seventh through tenth, three image set includes an image in the frontal plane, the sagittal plane, and the transverse plane.

Example 6

A computer-implemented method for providing hip version and tibial torsion values, the method including receiving a plurality of images from a three-dimensional scan of at least one lower limb of a patient, the images including plurality of three image sets, wherein the three-image sets include an image in a frontal plane, an image in a sagittal plane, and an image in a transverse plane; determining a femoral neck axis by determining a center of a femoral head on a first three-image set and a center of a base of a femoral neck on a second three-image set; determining a distal femoral axis associated with an axis of rotation of a femur of a patient at a distal end of the femur, wherein the distal femoral axis is identified in a third three-image set and a fourth three-image set; determining an angle between the femoral neck axis and the distal femoral axis, wherein the angle between the femoral neck axis and the distal femoral axis is representative of hip version; determining a proximal tibia axis associated with an axis of rotation of a tibia of the patient at a proximal end of the tibia, wherein the proximal tibia axis is identified in a fifth three-image set and a sixth three-image set; determining a distal tibia axis associated with an axis of rotation of the tibia of the patient at a distal end of the tibia, wherein the distal tibia axis is identified in a seventh three-image set, an eighth three-image set, a ninth three-image set, and a tenth three-image set; and determining an angle between the proximal tibia axis and the distal tibia axis or a transmalleolar axis, wherein the angle between the proximal tibia axis and the distal tibia axis or transmalleolar axis is representative of tibial torsion.

The computer-implemented method includes providing a shape on the first three-image set and the second three-image set, wherein the shape is representative of a three-dimensional shape.

The computer-implemented method includes sizing the shape to a largest size which is capable of being positioned within the base of the femoral neck and such that the shape is shown contacting cortices of the base of the femoral neck in at least two images of the second three-image set.

The computer-implemented method includes finding a centroid of the femoral head and a centroid of the base of the femoral neck.

The computer-implemented method includes determining and selecting the center of the femoral head and the center of the base of the femoral neck on the first and second three-image sets, wherein the first and second three-image sets are selected from a plurality of three-image sets.

The computer-implemented method includes determining the center of the femoral head, the center of the base of the femoral neck, determining the distal femoral axis, determining the proximal tibia axis, and determining the distal tibia axis is accomplished by a computer system, wherein software is programmed to make determinations based on previous training on a plurality of samples.

The description and illustrations of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalent.

The system or systems described herein may be implemented on any form of computer or computers and the algorithms and programs may be implemented as dedicated applications or in client-server architectures, including a web-based architecture, and can include functional programs, codes, and code segments. The computer system of the present invention may include a software program be stored on a computer and/or storage device (e.g., mediums), and/or may be executed through a network. The computer steps may be implemented through program code or program modules stored on a storage medium.

It is contemplated that any of the methods and/or systems may include providing an output to a display, such as a computer display. The output may include graphics such as one or more of the lines may be displayed in relation to (i) the 3D model of the limb, (ii) the other lines, and/or (iii) the predetermined reference data, such as data representing the baseline hip version or tibia torsion. The methods and systems may also permit the user to manipulate the 3D model so as to visualize the lines on the model in different orientations. The methods and systems may also provide relevant indicators such as angles, percentages, anatomical states, and so forth relating to the hip flexion and tibial torsion determined via the methods and systems described herein.

The computer processes herein may be described in terms of various processing steps. Such processing steps may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail.

Any of the methods and examples provided herein, where applicable, may be implemented on a computing device including one or more processor and a memory storing instructions that, when executed by the one or more processors, cause the one or more processors to execute the methods as described herein.

Any of the methods and examples provided herein, where applicable, may be stored on a transitory or non-transitory computer-readable medium storing instructions for providing hip version and tibial torsion values, the instructions when executed by one or more processors of a computing device, cause the computing device to execute the methods as described herein.

Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A computer-implemented method of determining axial alignment of a lower limb, comprising:
   determining with a processor a three-dimensional volume based on a plurality of datasets comprising a first dataset and a second dataset, the first dataset comprising a first set of images, the second dataset comprising a second set of images, the first set of images and the second set of images being obtained from a scan of a lower limb of the patient;
   correlating with the processor the first set of images from the first dataset to map a first axis of symmetry of a femoral neck and a second axis of symmetry of a distal portion of a femur within the three-dimensional volume;
   correlating with the processor the second set of images from the second dataset to map a third axis of symmetry of a proximal portion of a tibia and a fourth axis of symmetry of a distal portion of the tibia within the three-dimensional volume;
   identifying with the processor a level of hip version by referring to the first axis of symmetry and the second axis of symmetry, wherein hip version is defined by an angle between the first axis of symmetry and the second axis of symmetry;
   identifying with the processor a level of tibial torsion by referring to the third axis of symmetry and the fourth axis of symmetry, wherein tibial torsion is defined by an angle between the third axis of symmetry and the fourth axis of symmetry; and
   providing with the processor the level of hip version and the level of tibial torsion to a user.

2. The method of claim 1, wherein identifying the axes of symmetry of the femoral neck, the distal portion of the femur, the proximal portion of the tibia, and the distal portion of the tibia includes the identifying the axes of symmetry by referring to the two-dimensional shapes or three-dimensional shapes of the lower limb in images from the scan.

3. The method of claim 1, wherein identifying the axis of symmetry of the femoral neck, the distal portion of the femur, the proximal portion of the tibia, and the distal portion of the tibia includes identifying the axis of symmetry by referring to reference points on the lower limb in images from the scan.

4. The method of claim 1, wherein the angle between the first axis and the second axis is compared in a single plane.

5. The method of claim 1, wherein the scan is a single scan of an entirety of the lower limb.

6. The method of claim 1, wherein the scan is taken when the patient is weight bearing.

7. The method of claim 1, further comprising providing a relationship of the patient's level of hip version and tibial torsion to a predetermined level of hip version and tibial torsion.

8. The method of claim 1, further comprising displaying to a user alignment of the lower limb, wherein the alignment is displayed by overlaying the first axis with the second axis, the third axis, and the fourth axis.

9. A computer-implemented method of determining axial alignment of a lower limb of a patient, comprising:
   controlling with a processor a CT or MRI scanner to scan a lower limb of the patient to produce a scan that comprises images including sections in a frontal plane, sections in a sagittal plane, and sections in a transverse plane;
   in a three-dimensional space, aligning with the processor the images in any one or more of the frontal plane, the sagittal plane, and the transverse plane;
   generating with the processor a map of the lower limb in the three-dimensional space from the aligned images;
   obtaining with the processor a level of hip version from the map; and
   obtaining with the processor a level of tibial torsion from the map.

10. The method of claim 9, wherein aligning the images comprises viewing an image in the transverse plane through a pelvis of the patient at a height of an anterior iliac spine of the iliac crest and rotating the image in the transverse plane for symmetry.

11. The method of claim 9, wherein obtaining the level of hip version includes determining a femoral neck angle based on a position of a center of a femoral head relative to a center of a base of a femoral neck, wherein the positions of the center of the femoral head and the center of the base of the femoral neck are identified in three-dimensional space in a first image set and a second image set, respectively, wherein each of the first and second image set includes an image in the frontal plane, the sagittal plane, and the transverse plane.

12. The method of claim 9, wherein obtaining the level of hip version further includes determining a distal femoral angle based on a position of a posterior position of a medial femoral condyle or epicondyle to a posterior position of a lateral femoral condyle or epicondyle, respectively, wherein the posterior position of the medial femoral condyle or epicondyle and posterior position of the lateral femoral condyle or epicondyle are identified in three-dimensional space in a third image set and a fourth image set, respectively, wherein each of the third and fourth image set includes an image in the frontal plane, the sagittal plane, and the transverse plane.

13. The method of claim 9, wherein obtaining the level of tibial torsion includes determining a proximal tibial angle relating to an axis of rotation of a proximal end of a tibia, wherein the proximal tibial angle is based on a position of an anterior position of a medial tibial condyle to an anterior position of a lateral tibial condyle, wherein the anterior position of the medial tibial condyle and anterior position of the lateral tibial condyle are identified in three-dimensional space in a fifth image set and a sixth image set, respectively, wherein each of the fifth and sixth image set includes an image in the frontal plane, the sagittal plane, and the transverse plane.

14. The method of claim 13, wherein obtaining the level of tibial torsion includes determining a distal tibial angle relating to a line connecting a center of a first tangential line extending between outermost lateral surfaces of a medial malleolus and a second tangential line extending between innermost medial surfaces of a lateral malleolus.

15. The method of claim 14, wherein identifying tibial torsion includes identifying a posterior position on the outermost lateral surfaces of the medial malleolus, an anterior position on the outermost lateral surfaces of the medial malleolus, a posterior position on the innermost medial surfaces of the lateral malleolus, and an anterior position on the innermost lateral surfaces of the medial malleolus in three-dimensional space in a seventh image set, an eighth image set, a ninth image set, and a tenth image set, respectively, wherein each of the seventh through tenth image set includes an image in the frontal plane, the sagittal plane, and the transverse plane.

16. The method of claim 9, further comprising taking the scan while the patient is weight bearing.

17. A computer-implemented method for providing hip version and tibial torsion values, the method comprising:
controlling with a processor a CT or MRI scanner to scan at least one lower limb of a patient to produce a three-dimensional scan that comprises a plurality of images including sections in a frontal plane, sections in a sagittal plane, and sections in a transverse plane;
receiving with the processor the plurality of images from the three-dimensional scan, the images including a plurality of image sets, wherein each image set of the image sets includes an image in a frontal plane, an image in a sagittal plane, and an image in the transverse plane;
determining with the processor a femoral neck axis by determining a center of a femoral head on a first image set of the plurality of image sets and a center of a base of a femoral neck on a second image set of the plurality of image sets;
determining with the processor a distal femoral axis associated with an axis of rotation of a femur of a patient at a distal end of the femur, wherein the distal femoral axis is identified in a third image set of the plurality of image sets and a fourth image set of the plurality of image sets;
determining with the processor an angle between the femoral neck axis and the distal femoral axis, wherein the angle between the femoral neck axis and the distal femoral axis is representative of hip version;
determining with the processor a proximal tibia axis associated with an axis of rotation of a tibia of the patient at a proximal end of the tibia, wherein the proximal tibia axis is identified in a fifth image set of the plurality of image sets and a sixth image set of the plurality of image sets;
determining with the processor a distal tibia axis associated with an axis of rotation of the tibia of the patient at a distal end of the tibia, wherein the distal tibia axis is identified in a seventh image set of the plurality of image sets, an eighth image set of the plurality of image sets, a ninth image set of the plurality of image sets, and a tenth image set of the plurality of image sets; and
determining with the processor an angle between the proximal tibia axis and the distal tibia axis or a transmalleolar axis, wherein the angle between the proximal tibia axis and the distal tibia axis or transmalleolar axis is representative of tibial torsion.

18. The computer-implemented method of claim 17, wherein determining the femoral neck axis includes providing a shape on the first image set and the second image set, wherein the shape is representative of a three-dimensional shape.

19. The computer-implemented method of claim 18, wherein determining the femoral neck axis includes sizing the shape to a largest size which is capable of being positioned within the base of the femoral neck and such that the shape is shown contacting cortices of the base of the femoral neck in at least two images of the second image set of the plurality of image sets.

20. The computer-implemented method of claim 17, wherein determining the femoral neck axis includes finding a centroid of the femoral head and a centroid of the base of the femoral neck.

21. The computer-implemented method of claim 17, wherein determining the femoral neck axis includes determining and selecting the center of the femoral head and the center of the base of the femoral neck on the first and second image sets of the plurality of image sets.

22. The computer-implemented method of claim 17, wherein determining the center of the femoral head, determining the center of the base of the femoral neck, determining the distal femoral axis, determining the proximal tibia axis, and determining the distal tibia axis is accomplished by a computer system including software module, and wherein software module is programmed to make the determinations based on previous training on a plurality of samples.

23. A computing device for providing hip version and tibial torsion values of a patient, the computing device comprising:
one or more processors; and
a memory storing instructions that, when executed by the one or more processors, cause the one or more processors to:
determine a three-dimensional volume based on a plurality of datasets comprising a first dataset and a second dataset, the first dataset comprising a first set of images, the second dataset comprising a second set of images, the first set of images and the second set of images being obtained from a scan of a lower limb of the patient;
correlating the first set of images from the first dataset to map a first axis of symmetry of a femoral neck and a second axis of symmetry of a distal portion of a femur within the three-dimensional volume;
correlating the second set of images from the second dataset to map a third axis of symmetry of a proximal portion of a tibia and a fourth axis of symmetry of a distal portion of the tibia within the three-dimensional volume;
identify a level of hip version by referring to the first axis of symmetry and the second axis of symmetry, wherein hip version is defined by an angle between the first axis of symmetry and the second axis of symmetry;
identify a level of tibial torsion by referring to the third axis of symmetry and the fourth axis of symmetry, wherein tibial torsion is defined by an angle between the third axis of symmetry and the fourth axis of symmetry; and
provide the level of hip version and the level of tibial torsion to a user.

24. The computing device of claim 23, wherein identifying the axes of symmetry of the femoral neck, the distal portion of the femur, the proximal portion of the tibia, and the distal portion of the tibia includes the identifying the axis of symmetry by referring to the two-dimensional shapes or three-dimensional shape of the lower limb in images from the scan.

25. The computing device of claim 23, wherein identifying the axis of symmetry of the femoral neck, the distal portion of the femur, the proximal portion of the tibia, and the distal portion of the tibia includes identifying the axis of symmetry by referring to reference points on lower limb in images from the scan.

26. The computing device of claim 23, wherein the angle between the first axis and the second axis is compared in a single plane.

27. The computing device of claim 23, wherein the scan is a single scan of an entirety of the lower limb.

28. The computing device of claim 23, wherein the scan is taken when the patient is weight bearing.

29. The computing device of claim 23, further configured to provide a relationship of the patient's level of hip version and tibial torsion to a predetermined level of hip version and tibial torsion.

30. The computing device of claim 23, further configured to display to a user alignment of the lower limb, wherein the alignment is displayed by overlaying the first axis with the second axis, the third axis, and the fourth axis.

31. A non-transitory computer-readable medium having computer-readable instructions stored thereon for providing hip version and tibial torsion values of a patient, the instructions when executed by one or more processors of a computing device, cause the computing device to:
  determine a three-dimensional volume based on a plurality of datasets comprising a first dataset and a second dataset, the first dataset comprising a first set of images, the second dataset comprising a second set of images, the first set of images and the second set of images being obtained from a scan of a lower limb of the patient;
  correlating the first set of images from the first dataset to map a first axis of symmetry of a femoral neck and a second axis of symmetry of a distal portion of a femur within the three-dimensional volume;
  correlating the second set of images from the second dataset to map a third axis of symmetry of a proximal portion of a tibia and a fourth axis of symmetry of a distal portion of the tibia within the three-dimensional volume;
  identify a level of hip version by referring to the first axis of symmetry and the second axis of symmetry, wherein hip version is defined by an angle between the first axis of symmetry and the second axis of symmetry;
  identify a level of tibial torsion by referring to the third axis of symmetry and the fourth axis of symmetry, wherein tibial torsion is defined by an angle between the third axis of symmetry and the fourth axis of symmetry; and
  provide the level of hip version and the level of tibial torsion to a user.

32. The non-transitory computer-readable medium of claim 31, wherein identifying the axes of symmetry of the femoral neck, the distal portion of the femur, the proximal portion of the tibia, and the distal portion of the tibia includes the identifying the axis of symmetry by referring to the two-dimensional shapes or three-dimensional shape of the lower limb in images from the scan.

33. The non-transitory computer-readable medium of claim 31, wherein identifying the axis of symmetry of the femoral neck, the distal portion of the femur, the proximal portion of the tibia, and the distal portion of the tibia includes identifying the axis of symmetry by referring to reference points on lower limb in images from the scan.

34. The non-transitory computer-readable medium of claim 31, wherein the angle between the first axis and the second axis is compared in a single plane.

35. The non-transitory computer-readable medium of claim 31, wherein the scan is a single scan of an entirety of the lower limb.

36. The non-transitory computer-readable medium of claim 31, wherein the scan is taken when the patient is weight bearing.

37. The non-transitory computer-readable medium of claim 31, further comprising providing a relationship of the patient's level of hip version and tibial torsion to a predetermined level of hip version and tibial torsion.

38. The non-transitory computer-readable medium of claim 31, further comprising displaying to a user alignment of the lower limb, wherein the alignment is displayed by overlaying the first axis with the second axis, the third axis, and the fourth axis.

* * * * *